(12) United States Patent
Menard et al.

(10) Patent No.: US 12,210,590 B2
(45) Date of Patent: Jan. 28, 2025

(54) SYSTEMS AND METHODS FOR AN ARTIFICIAL INTELLIGENCE/MACHINE LEARNING MEDICAL CLAIMS PLATFORM

(71) Applicant: Experian Health, Inc., Franklin, TN (US)

(72) Inventors: Johnathan P. Menard, Hamden, CT (US); Robert J. Stucker, Las Vegas, NV (US); Elsie E. Henry, Wilkes Barre, PA (US); Ali Saffari, Diamond Bar, CA (US); John R. Bush, Naperville, IL (US); Robert P. Hattori, Davis, CA (US); Harry David Hickey, Chicago, IL (US)

(73) Assignee: Experian Health, Inc., Franklin, TN (US)

( * ) Notice: Subject to any disclaimer, the term of this patent is extended or adjusted under 35 U.S.C. 154(b) by 547 days.

(21) Appl. No.: 17/646,996

(22) Filed: Jan. 4, 2022

(65) Prior Publication Data

US 2023/0214455 A1    Jul. 6, 2023

(51) Int. Cl.
    *G06N 20/00*    (2019.01)
    *G06F 3/0482*    (2013.01)
    *G06F 3/04847*    (2022.01)
    *G06F 18/21*    (2023.01)

(52) U.S. Cl.
    CPC .......... *G06F 18/217* (2023.01); *G06F 3/0482* (2013.01); *G06F 3/04847* (2013.01); *G06N 20/00* (2019.01)

(58) Field of Classification Search
CPC .. G06F 18/217; G06F 3/0482; G06F 3/04847; G06N 20/00
USPC ........................................................ 706/12
See application file for complete search history.

*Primary Examiner* — Austin Hicks
(74) *Attorney, Agent, or Firm* — Knobbe, Martens, Olson & Bear, LLP

(57) ABSTRACT

Embodiments of various systems, methods, and devices are disclosed for generating artificial intelligence or machine learning models for predicting denials of medical claims, predicting approvals of resubmitted medical claims, as well as automatic workflow clustering processes for automatically assigning medical claims to workflow queues using predictive segmentation and smart resource allocation.

33 Claims, 13 Drawing Sheets

Claim Submission — 700

Doe, Patient
123 Main Street
Anytown, ST 12345

| Service Date | Description | Amount |
|---|---|---|
| 01/01/1900 | Claim Item 1 | $123 |
| 01/01/1900 | Claim Item 2 | $456 |
| 01/01/1900 | Claim Item 3 | $789 |
| 01/01/1900 | Claim Item 4 | $987 |
| 01/01/1900 | Claim Item 5 | $654 |
| ... | | |
| 01/01/1900 | Claim Item N | $123 |

701, 702, 703

| R | I | W | Description | Score |
|---|---|---|---|---|
| ⊗ | ○ | ○ | Zip code is inconsistent with state | 87% |
| ○ | ⊛ | ○ | More than 12 months since diagnostic scan | 70% |
| ⊗ | ○ | ⊛ | Procedure not approved for under age 35 | 95% |

SYSTEMS AND METHODS FOR AN ARTIFICIAL INTELLIGENCE/MACHINE LEARNING MEDICAL CLAIMS PLATFORM

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF EMBODIMENTS

The disclosure relates to an artificial intelligence/machine learning platform used to generate medical claim predictions and decisioning to automatically route denied medical claims to workflow queues for remediation.

SUMMARY OF EMBODIMENTS

Various systems, methods, and devices are disclosed for generating artificial intelligence or machine learning models for predicting denials of medical claims, predicting approvals of resubmitted medical claims, and providing automatic workflow clustering processes for automatically assigning medical claims to workflow queues using predictive segmentation and smart resource allocation. The systems, methods, and devices of the disclosure each have several innovative aspects, no single one of which is solely responsible for the desirable attributes disclosed herein.

In one embodiment, a system for tuning a claims remittance prediction model is provided. The system comprises: one or more processors; a network communications interface; a memory; and computer code stored in the memory, wherein the computer code, when retrieved from the memory and executed by the one or more processors causes the one or more processors to: electronically access a set of claims data set associated with a first plurality of healthcare claims, a second plurality of patients, and one or more payer entities associated with entities that provide reimbursement or payment for healthcare services, and a provider identifier associated with a provider of healthcare services; electronically access processing parameters specific for the provider using the provider identifier; electronically access custom modifications specific for the provider using the provider identifier; electronically access regulatory parameters related to one more of federal requirements, state requirements, or county requirements; apply the processing parameters, the custom modifications, and the regulatory parameters to the set of claims data to generate a set of modified claims data, the analysis parameters including one or more of: data standardization, data linking, or automated data generation; generate an artificial intelligence/machine learning request data package for submission to a server to electronically apply a claims denial probability artificial intelligence or machine learning model which is configured to, for each claim associated with the set of modified claims data, predict the likelihood of being denied and generate one or more denial reasons; send the artificial intelligence/machine learning request data package to a model deployment interface of the server via the network communications interface; receive from the server a set of claims denial prediction data associated with the set of modified claims data and associated with the first plurality of healthcare claims, the set of claims denial prediction data comprising: prediction indicators indicating the likelihood of being denied by an associated payer entity, and denial reasons indicating potential reasons for denial; automatically process the set of claims denial prediction data to electronically identify a first set of claims of the first plurality of healthcare claims associated with a first payer entity of the one or more payer entities where each claim in the first set of claims is associated with a prediction indicator of the set of claims denial production data that meet a first threshold indicating a low likelihood of being denied; generate a first encrypted claim submission data package comprising the first set of claims; send, via the network communication interface, the first encrypted data claim submission package to a first communications interface associated with the first payer entity; electronically identify a second set of claims of the first plurality of healthcare claims associated with a second payer entity of the one or more payer entities where each claim in the second set of claims is associated with a prediction indicator of the set of claims denial production data that meet a first threshold indicating a low likelihood of being denied; generate a second encrypted claim submission data package comprising the second set of claims; send, via the network communication interface, the second encrypted data claim submission package to a second communications interface associated with the second payer entity; electronically identify a third set of claims of the first plurality of healthcare claims associated with the first payer entity where each claim in the third set of claims is associated with a prediction indicator of the set of claims denial production data that meet a second threshold indicating a high likelihood of being denied and associated with at least one denial reason indicating potential reasons for denial for the respective claim; generate at least one recommended corrective action for each of the claims in the third set of claims based on at least the at least one denial reason; generate instructions to present the at least one recommended corrective action for each of the claims in the third set of claims in a user interface for electronic approval by a first agent system; in response to receiving an electronic indication of the electronic approval by the first agent system, automatically implement the at least one recommended corrective action for each of the claims in the third set of claims; generate a third encrypted claim submission data package comprising a corrected third set of claims; send, via the network communication interface, the third encrypted data claim submission package to the first communications interface associated with the first payer entity; access a first set of electronic payer remit data associated with the first set of claims and the third set of claims and indicating a respective approval status or denial status of each claim; access a second set of electronic payer remit data associated with the second set of claims a respective approval status or denial status of each claim; electronically process the first set of payer remit data and the second set of payer remit data to associate the first set of payer remit data and the second set of payer remit data with the first set of claims, the second set of claims, and the third set of claims to determine approval or denial status for each claim in the first set of claims, the second set of claims, and the third set of claims; generate a claim determination data package comprising an electronic indication of determined approval or denial status for each claim in the first set of claims, the second set of claims, and the third set of claims; and send, via the network communication interface, the claim determination data package to a model development server for updating of the claims denial probability artificial intelligence or machine learning model using the electronic indication of determined approval or denial status for each claim in the first set of claims, the second set of claims, and the third set of claims in the claim determination data package.

In another embodiment, a computer-implemented method of deploying a claims remittance predictive model is provided. The computer-implemented method comprises, as implemented by one or more computing devices configured with specific executable instructions to: electronically access a set of claims data set associated with a first plurality of healthcare claims, a second plurality of patients, and one or more payer entities associated with entities that provide reimbursement or payment for healthcare services, and a provider identifier associated with a provider of healthcare services; electronically access processing parameters specific for the provider using the provider identifier; electronically access custom modifications specific for the provider using the provider identifier; electronically access regulatory parameters related to one more of federal requirements, state requirements, or county requirements, apply the processing parameters, the custom modifications, and the regulatory parameters to the set of claims data to generate a set of modified claims data, the analysis parameters including one or more of: data standardization, data linking, or automated data generation; generate an artificial intelligence/machine learning request data package for submission to a server to electronically apply a claims denial probability artificial intelligence or machine learning model which is configured to, for each claim associated with the set of modified claims data, predict the likelihood of being denied and generate one or more denial reasons; send the artificial intelligence/machine learning request data package to a model deployment interface of the server; receive from the server a set of claims denial prediction data associated with the set of modified claims data and associated with the first plurality of healthcare claims, the set of claims denial prediction data comprising: prediction indicators indicating the likelihood of being denied by an associated payer entity, and denial reasons indicating potential reasons for denial; automatically process the set of claims denial prediction data to electronically identify a first set of claims of the first plurality of healthcare claims associated with a first payer entity of the one or more payer entities where each claim in the first set of claims is associated with a prediction indicator of the set of claims denial production data that meet a first threshold indicating a low likelihood of being denied; generate a first encrypted claim submission data package comprising the first set of claims; send the first encrypted data claim submission package to a first communications interface associated with the first payer entity; electronically identify a second set of claims of the first plurality of healthcare claims associated with a second payer entity of the one or more payer entities where each claim in the second set of claims is associated with a prediction indicator of the set of claims denial production data that meet a first threshold indicating a low likelihood of being denied; generate a second encrypted claim submission data package comprising the second set of claims; send the second encrypted data claim submission package to a second communications interface associated with the second payer entity; electronically identify a third set of claims of the first plurality of healthcare claims associated with the first payer entity where each claim in the third set of claims is associated with a prediction indicator of the set of claims denial production data that meet a second threshold indicating a high likelihood of being denied and associated with at least one denial reason indicating potential reasons for denial for the respective claim; generate at least one recommended corrected action for each of the claims in the third set of claims based on at least the at least one denial reason; generate instructions to present the at least one recommended corrected action for each of the claims in the third set of claims in a user interface for electronic approval by a first agent system; in response to receiving an electronic indication of the electronic approval by the first agent system, automatically implement the at least one recommended corrected action for each of the claims in the third set of claims; generate a third encrypted claim submission data package comprising the corrected third set of claims; send the third encrypted data claim submission package to the first communications interface associated with the first payer entity; access a first set of electronic payer remit data associated with the first set of claims and the third set of claims and indicating a respective approval status or denial status of each claim; access a first set of electronic payer remit data associated with the second set of claims a respective approval status or denial status of each claim; electronically process the first set of payer remit data and the second set of payer remit data to associate the first set of payer remit data and the second set of payer remit data with the first set of claims, the second set of claims, and the third set of claims to determine approval or denial status for each claim in the first set of claims, the second set of claims, and the third set of claims; generate a claim determination data package comprising an electronic indication of determined approval or denial status for each claim in the first set of claims, the second set of claims, and the third set of claims; and send the claim determination data package to a model development server for updating of the claims denial probability artificial intelligence or machine learning model using the electronic indication of determined approval or denial status for each claim in the first set of claims, the second set of claims, and the third set of claims in the claim determination data package.

In a further embodiment, a non-transitory computer storage medium storing computer-executable instructions is provided. The non-transitory computer storage medium stores computer-executable instructs that, when executed by a processor, cause the processor to at least: electronically access a set of claims data set associated with a first plurality of healthcare claims, a second plurality of patients, and one or more payer entities associated with entities that provide reimbursement or payment for healthcare services, and a provider identifier associated with a provider of healthcare services; electronically access processing parameters specific for the provider using the provider identifier; electronically access custom modifications specific for the provider using the provider identifier; electronically access regulatory parameters related to one more of federal requirements, state requirements, or county requirements, apply the processing parameters, the custom modifications, and the regulatory parameters to the set of claims data to generate a set of modified claims data, the analysis parameters including one or more of: data standardization, data linking, or automated data generation; generate an artificial intelligence/machine learning request data package for submission to a server to electronically apply a claims denial probability artificial intelligence or machine learning model which is configured to, for each claim associated with the set of modified claims data, predict the likelihood of being denied and generate one or more denial reasons; send the artificial intelligence/machine learning request data package to a model deployment interface of the server; receive from the server a set of claims denial prediction data associated with the set of modified claims data and associated with the first plurality of healthcare claims, the set of claims denial prediction data comprising: prediction indicators indicating the likelihood of being denied by an associated payer entity, and denial reasons indicating potential reasons for denial; automatically process the set of claims denial prediction data to electronically identify a first set of claims of the first plurality of healthcare claims associated with a first payer entity of the one or more payer entities where each claim in the first set of claims is associated with a prediction indicator of the set of claims denial production data that meet a first threshold indicating a low likelihood of being denied; generate a first encrypted claim submission data package comprising the first set of claims; send the first encrypted data claim submission package to a first communications interface associated with the first payer entity; electronically identify a second set of claims of the first plurality of healthcare claims associated with a second payer entity of the one or more payer entities where each claim in the second set of claims is associated with a prediction indicator of the set of claims denial production data that meet a first threshold indicating a low likelihood of being denied; generate a second encrypted claim submission data package comprising the second set of claims; send the second encrypted data claim submission package to a second communications interface associated with the second payer entity; electronically identify a third set of claims of the first plurality of healthcare claims associated with the first payer entity where each claim in the third set of claims is associated with a prediction indicator of the set of claims denial production data that meet a second threshold indicating a high likelihood of being denied and associated with at least one denial reason indicating potential reasons for denial for the respective claim; generate at least one recommended corrected action for each of the claims in the third set of claims based on at least the at least one denial reason; generate instructions to present the at least one recommended corrected action for each of the claims in the third set of claims in a user interface for electronic approval by a first agent system; in response to receiving an electronic indication of the electronic approval by the first agent system, automatically implement the at least one recommended corrected action for each of the claims in the third set of claims; generate a third encrypted claim submission data package comprising the corrected third set of claims; send the third encrypted data claim submission package to the first communications interface associated with the first payer entity; access a first set of electronic payer remit data associated with the first set of claims and the third set of claims and indicating a respective approval status or denial status of each claim; access a first set of electronic payer remit data associated with the second set of claims a respective approval status or denial status of each claim; electronically process the first set of payer remit data and the second set of payer remit data to associate the first set of payer remit data and the second set of payer remit data with the first set of claims, the second set of claims, and the third set of claims to determine approval or denial status for each claim in the first set of claims, the second set of claims, and the third set of claims; generate a claim determination data package comprising an electronic indication of determined approval or denial status for each claim in the first set of claims, the second set of claims, and the third set of claims; and send the claim determination data package to a model development server for updating of the claims denial probability artificial intelligence or machine learning model using the electronic indication of determined approval or denial status for each claim in the first set of claims, the second set of claims, and the third set of claims in the claim determination data package.

In another embodiment, a system for tuning a claims resubmission predictive model is provided. The system comprises: one or more processors; a network communications interface; a memory; and computer code stored in the memory, wherein the computer code, when retrieved from the memory and executed by the one or more processors causes the one or more processors to: access a first set of electronic payer remit data associated with a first set of healthcare claims, a first plurality of patients, a second plurality of provider identifiers associated with providers of healthcare services, and a first payer entity associated with an entity that provide reimbursement or payment for healthcare services; electronically process the first set of electronic payer remit data to associate each remit data item with at least one of the first set of healthcare claims and an outcome status indicating either approval or denial for each respective healthcare claim to generate a set of denied claims whose outcome status indicates denial; generate an artificial intelligence/machine learning request data package for submission to a server to electronically apply a claims resubmission probability artificial intelligence or machine learning model which is configured to, for each claim associated with the set of denied claims, predict the likelihood of being approved upon resubmission; send the artificial intelligence/machine learning request data package to a model deployment interface of the server via the network communications interface; receive from the server a set of claims resubmission prediction data associated with the set of denied claims and associated with the first plurality of healthcare claims, the set of claims denial resubmission prediction data comprising: prediction indicators indicating the likelihood of being approved upon resubmission; electronically access first resubmission parameters associated with a first provider identifier of the second plurality of provider identifiers, the first provider identifier associated with a first subset of the set of denied claims; automatically process the first subset of denied claims using at least the first resubmission parameters, the respective prediction indicators indicating the likelihood of being approved upon resubmission, to automatically generate a set of high-priority denied claims from the first subset of denied claims; automatically generate a resubmission data package comprising the set of high-priority denied claims and a high-priority flag; send, via the network communication interface, the resubmission data package to a triage system for processing based on the high-priority flag; access a second set of electronic payer remit data associated with the first set of high-priority denied claims and indicating a respective approval status or denial status of each claim; electronically process the second set of payer remit data to associate the second set of payer remit data with the set of high-priority denied claims to determine approval or denial status for each claim in the set of high-priority denied claims; generate a claim determination data package comprising an electronic indication of determined approval or denial status for each claim in the set of high-priority denied claims; and send, via the network communication interface, the claim determination data package to a model development server for updating of the claims resubmission probability artificial intelligence or machine learning model using the electronic indication of determined approval or denial status for each claim in the set of high-priority denied claims in the claim determination data package.

In an additional embodiment, a computer-implemented method of deploying a claims resubmission predictive model is provided. The computer-implemented method comprises, as implemented by one or more computing devices configured with specific executable instructions to: access a first set of electronic payer remit data associated with a first set of healthcare claims, a first plurality of patients, a second plurality of provider identifiers associated with providers of healthcare services, and a first payer entity associated with an entity that provide reimbursement or payment for healthcare services; electronically process the first set of electronic payer remit data to associate each remit data item with at least one of the first set of healthcare claims and an outcome status indicating either approval or denial for each respective healthcare claim to generate a set of denied claims whose outcome status indicates denial; generate an artificial intelligence/machine learning request data package for submission to a server to electronically apply a claims resubmission probability artificial intelligence or machine learning model which is configured to, for each claim associated with the set of denied claims, predict the likelihood of being approved upon resubmission; send the artificial intelligence/machine learning request data package to a model deployment interface of the server via the network communications interface; receive from the server a set of claims resubmission prediction data associated with the set of denied claims and associated with the first plurality of healthcare claims, the set of claims denial prediction data comprising: prediction indicators indicating the likelihood of being approved upon resubmission; electronically access first resubmission parameters associated with a first provider identifier of the second plurality of providers, the first provider identifier associated with a first subset of the set of denied claims; automatically process the first subset of denied claims using at least the first resubmission parameters, the respective prediction indicators indicating the likelihood of being approved upon resubmission, to automatically generate a set of high-priority denied claims from the first subset of denied claims; automatically generate a resubmission data package comprising the set of high-priority denied claims and a high-priority flag; send the resubmission data package to a triage system for processing based on the high-priority flag; access a second set of electronic payer remit data associated with the first set of high-priority denied claims and indicating a respective approval status or denial status of each claim; electronically process the second set of payer remit data to associate the second set of payer remit data with the set of high-priority denied claims to determine approval or denial status for each claim in the set of high-priority denied claims; generate a claim determination data package comprising an electronic indication of determined approval or denial status for each claim in the set of high-priority denied claims; and send the claim determination data package to a model development server for updating of the claims resubmission probability artificial intelligence or machine learning model using the electronic indication of determined approval or denial status for each claim in the set of high-priority denied claims in the claim determination data package.

In another embodiment, a non-transitory computer storage medium storing computer-executable instructions is provided. The non-transitory computer storage medium stores computer-executable instructions that, when executed by a processor, cause the processor to at least: access a first set of electronic payer remit data associated with a first set of healthcare claims, a first plurality of patients, a second plurality of provider identifiers associated with providers of healthcare services, and a first payer entity associated with an entity that provide reimbursement or payment for healthcare services; electronically process the first set of electronic payer remit data to associate each remit data item with at least one of the first set of healthcare claims and an outcome status indicating either approval or denial for each respective healthcare claim to generate a set of denied claims whose outcome status indicates denial; generate an artificial intelligence/machine learning request data package for submission to a server to electronically apply a claims resubmission probability artificial intelligence or machine learning model which is configured to, for each claim associated with the set of denied claims, predict the likelihood of being approved upon resubmission; send the artificial intelligence/machine learning request data package to a model deployment interface of the server via the network communications interface; receive from the server a set of claims resubmission prediction data associated with the set of denied claims and associated with the first plurality of healthcare claims, the set of claims denial prediction data comprising: prediction indicators indicating the likelihood of being approved upon resubmission; electronically access first resubmission parameters associated with a first provider identifier of the second plurality of providers, the first provider identifier associated with a first subset of the set of denied claims; automatically process the first subset of denied claims using at least the first resubmission parameters, the respective prediction indicators indicating the likelihood of being approved upon resubmission, to automatically generate a set of high-priority denied claims from the first subset of denied claims; automatically generate a resubmission data package comprising the set of high-priority denied claims and a high-priority flag; send the resubmission data package to a triage system for processing based on the high-priority flag; access a second set of electronic payer remit data associated with the first set of high-priority denied claims and indicating a respective approval status or denial status of each claim; electronically process the second set of payer remit data to associate the second set of payer remit data with the set of high-priority denied claims to determine approval or denial status for each claim in the set of high-priority denied claims; generate a claim determination data package comprising an electronic indication of determined approval or denial status for each claim in the set of high-priority denied claims; and send the claim determination data package to a model development server for updating of the claims resubmission probability artificial intelligence or machine learning model using the electronic indication of determined approval or denial status for each claim in the set of high-priority denied claims in the claim determination data package.

In an additional embodiment, a computer-implemented method of deploying a claims processing predictive model is provided. The computer-implemented method comprises, as implemented by one or more computing devices configured with specific executable instructions to: electronically access a set of claims data set associated with a first plurality of healthcare claims, a second plurality of patients, and one or more payer entities associated with entities that provide reimbursement or payment for healthcare services, and a provider identifier associated with a provider of healthcare services; electronically access processing parameters specific for the provider using the provider identifier; electronically access custom modifications specific for the provider using the provider identifier; electronically access regulatory parameters related to one more of federal requirements, state requirements, or county requirements, apply the processing parameters, the custom modifications, and the regulatory parameters to the set of claims data to generate a set of modified claims data, the analysis parameters including one or more of: data standardization, data linking, or automated data generation; generate a first artificial intelligence/machine learning request data package for submission to a server to electronically apply a claims denial probability artificial intelligence or machine learning model which is configured to, for each claim associated with the set of modified claims data, predict the likelihood of being denied and generate one or more denial reasons; send the first artificial intelligence/machine learning request data package to a model deployment interface of the server via the network communications interface; receive from the server a set of claims denial prediction data associated with the set of modified claims data and associated with the first plurality of healthcare claims, the set of claims denial prediction data comprising: prediction indicators indicating the likelihood of being denied by an associated payer entity, and denial reasons indicating potential reasons for denial; automatically process the set of claims denial prediction data to electronically identify a first set of claims of the first plurality of healthcare claims associated with a first payer entity of the one or more payer entities where each claim in the first set of claims is associated with a prediction indicator of the set of claims denial production data that meet a first threshold indicating a low likelihood of being denied; generate a first encrypted claim submission data package comprising the first set of claims; send the first encrypted data claim submission package to a first communications interface associated with the first payer entity; electronically identify a second set of claims of the first plurality of healthcare claims associated with the second payer entity where each claim in the second set of claims is associated with a prediction indicator of the set of claims denial production data that meet a second threshold indicating a high likelihood of being denied and associated with at least one denial reason indicating potential reasons for denial for the respective claim; generate at least one recommended corrected action for each of the claims in the third set of claims based on at least the at least one denial reason; generate instructions to present the at least one recommended corrected action for each of the claims in the third set of claims in a user interface for electronic approval by a first agent system; in response to receiving an electronic indication of the electronic approval by the first agent system, automatically implement the at least one recommended corrected action for each of the claims in the third set of claims; generate a second encrypted claim submission data package comprising the corrected second set of claims; send the second encrypted data claim submission package to the first communications interface associated with the first payer entity; access a first set of electronic payer remit data associated with the first set of claims and the second set of claims and indicating a respective approval status or denial status of each claim; electronically process the first set of payer remit data to associate the first set of payer remit data with the first set of claims and the second set of claim to determine an outcome status indicating either approval or denial for each claim in the first set of claims and the second set of claims, and to generate a set of denied claims whose outcome status indicates denial; generate a claim determination data package comprising an electronic indication of determined outcome status for each claim in the first set of claims and the second set of claims; send the claim determination data package to a model development server for updating of the claims denial probability artificial intelligence or machine learning model using the electronic indication of determined outcome status for each claim in the first set of claims and the second set of claims in the claim determination data package; generate a second artificial intelligence/machine learning request data package for submission to the server to electronically apply a claims resubmission probability artificial intelligence or machine learning model which is configured to, for each claim associated with the set of denied claims, predict the likelihood of being approved upon resubmission; send the second artificial intelligence/machine learning request data package to the model deployment interface of the server via the network communications interface; receive from the server a set of claims resubmission prediction data associated with the set of denied claims and associated with the first plurality of healthcare claims, the set of claims denial prediction data comprising: prediction indicators indicating the likelihood of being approved upon resubmission; electronically access first resubmission parameters associated with a first provider identifier of the second plurality of providers, the first provider identifier associated with a first subset of the set of denied claims; automatically process the first subset of denied claims using at least the first resubmission parameters, the respective prediction indicators indicating the likelihood of being approved upon resubmission, to automatically generate a set of high-priority denied claims from the first subset of denied claims; automatically generate a resubmission data package comprising the set of high-priority denied claims and a high-priority flag; send the resubmission data package to a triage system for processing based on the high-priority flag; access a second set of electronic payer remit data associated with the first set of high-priority denied claims and indicating a respective approval status or denial status of each claim; electronically process the second set of payer remit data to associate the second set of payer remit data with the set of high-priority denied claims to determine approval or denial status for each claim in the set of high-priority denied claims; generate a claim determination data package comprising an electronic indication of determined approval or denial status for each claim in the set of high-priority denied claims; and send the claim determination data package to the model development server for updating of the claims resubmission probability artificial intelligence or machine learning model using the electronic indication of determined approval or denial status for each claim in the set of high-priority denied claims in the claim determination data package.

BRIEF DESCRIPTION OF THE DRAWINGS

These and other features, aspects, and advantage of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 7 is an example user interface for displaying one or more potential denial reasons according to an embodiment.

DETAILED DESCRIPTION OF EMBODIMENTS

Figure 1:
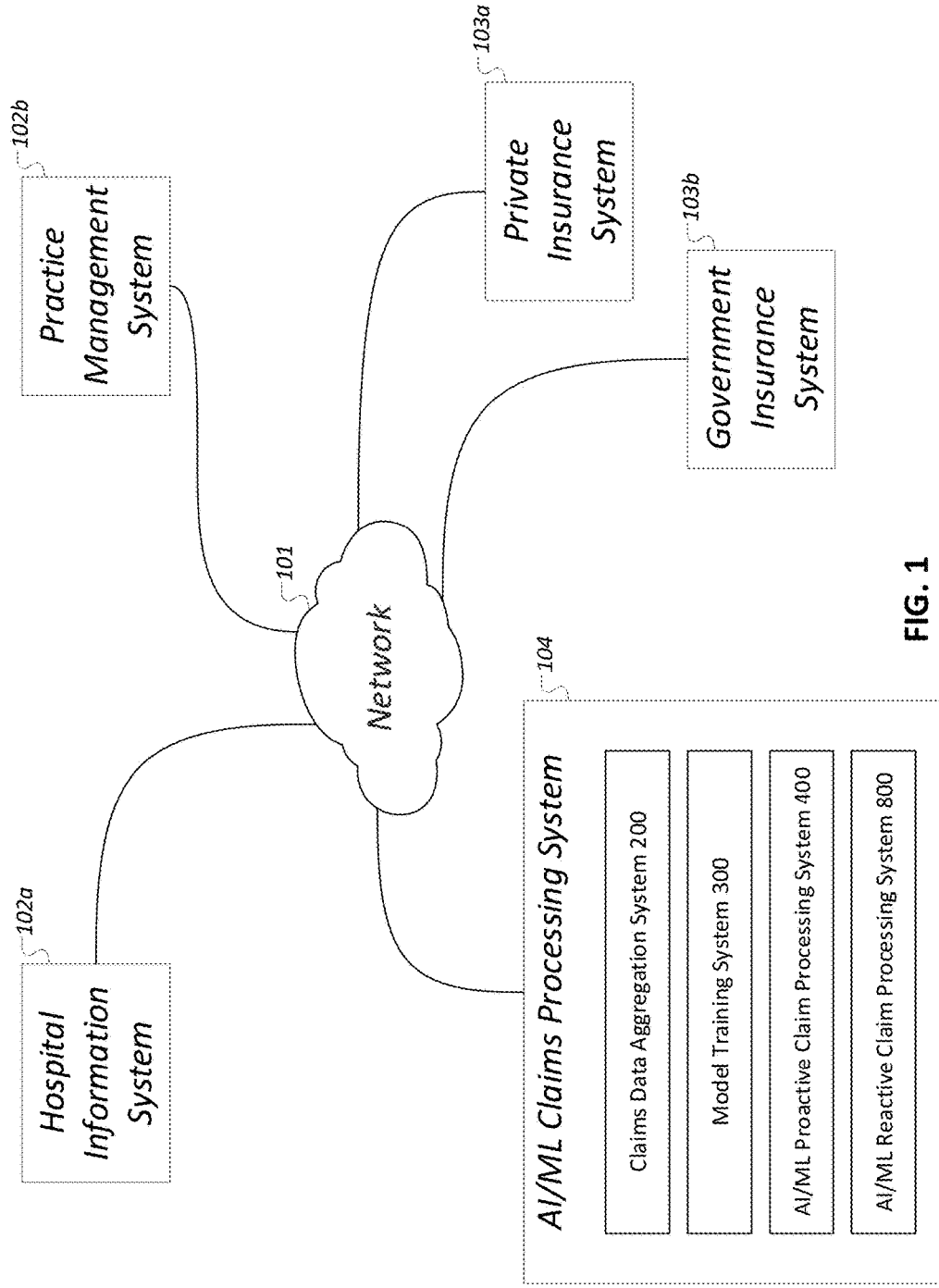
FIG. 1 illustrates a claims system in communication with provider systems and insurance systems according to an embodiment.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or essential to practicing the embodiments of the disclosure herein described. For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

As mentioned briefly above and as will now be explained in more detail and with reference to the drawings, this disclosure includes descriptions of systems and methods for using artificial intelligence/machine learning models for predicting claim denials prior to submission to payers using artificial intelligence/machine learning models and for remediating denied claims using artificial intelligence/machine learning models. Various machine learning and/or artificial intelligence may be used, including but not limited to supervised and non-supervised machine learning, including regression (such as, for example, Ordinary Least Squares Regression), instance-based algorithms (such as, for example, Learning Vector Quantization), decision trees (such as, for example, classification and regression trees), Bayesian algorithms (such as, for example, Naive Bayes), clustering (such as, for example, k-means clustering), association rule learning (such as, for example, Apriori algorithms), artificial neural networks (such as, for example, Perceptron), deep learning (such as, for example, Deep Boltzmann Machine), dimensionality reduction algorithms (such as, for example, Principal Component Analysis), ensemble algorithms (such as, for example, Stacked Generalization), and/or other machine learning or artificial intelligence. It is recognized that in addition to providing mode predictions, the systems and methods may also provide additional information, such as confidence codes, remarks/remark codes, and so forth.

Providers such as hospitals, doctors, medical groups, and other clinicians that bill for services often use hospital information systems, practice management systems or other systems to electronically process and submit claims for medical services to payer platforms, such as insurance company platforms, reimbursement platforms, or government systems. These submitted claims can be approved, but more often than wanted, some subset of the submitted claims are denied by the payer platforms. Denials may occur for a wide variety of reasons such as incorrect or outdated information about the patient or their insurance, transcription errors such as coding the wrong procedure or diagnosis, or failure to adhere to requirements imposed by insurance companies.

Once a claim has been denied, a provider may attempt to correct and resubmit the claim to the payer platform, but this process can be time-consuming and costly in terms of system resources and personnel, with little likelihood of repayment. Provider systems have difficulty determining which claims are worth attempting to remediate.

Payers such as Medicare, Medicaid, managed care payers and other, private, insurance companies have many rules that providers must adhere to in order to receive payment for services provided to patients. For example, some procedures or treatments may only be authorized for individuals over a certain age, while others may be restricted based on gender, may require prior authorization, and/or may require certain tests or procedures to be performed first. For example, it may be necessary for a provider to collect x-ray radiographs before performing a computed tomography scan. These rules may vary from payer to payer and even among different insurance policies offered by a single payer. Moreover, the rules may change over time. As a result, providers may encounter considerable difficulty complying with multiple sets of changing rules. This can lead to denied claims, which may have a significant impact on the patient experience as well as a disruption on providers who may invest significant resources into trying to obtain payment with mixed success. Additionally, many claim denials may be avoidable if problems are caught prior to claim submission but may not be recoverable if the claims are submitted and subsequently denied; thus, providers often prefer that claims be corrected prior to submission for payment.

Thus, systems and methods are needed that can identify problems with claims prior to submission and that can determine why some claims were denied and what the likely economic value is if denied claims are corrected and resubmitted to payers. However, existing systems use rules engines that are often inaccurate, based on out-of-date rules, or do not account for nuances among provider systems that are implementing the same rules. In some embodiments, systems may be used to generate and apply machine learning models based on filtered and siloed historical claims data to identify and correct problems prior to submission and to cluster denial data sets for generating appeal decisions that determine whether and how to appeal the denial of submitted claims. In some embodiments, said systems may securely interface with a provider's existing claims cycle platform, such as Experian Health ClaimSource®, using, for example, an application programming interface (API), a portal, an exchange system, or any other suitable connection or interface.

This disclosure describes embodiments of systems and methods that may be used to apply artificial intelligence and/or machine learning to identify and correct problems with claims and to help providers conduct automated decisioning and submit claims appeals for denied claims. In some embodiments, claims and remittance data may be collected from a plurality of providers including hospitals, medical groups, doctors, and/or other clinicians. This data may, in some embodiments, be used to train one or more artificial intelligence or machine learning models to recognize claims that are likely to be denied as to a specific set of payer systems and to generate one or more reason codes or decisioning tools to reduce denials. In some embodiments, aggregating claims and remittance data across a plurality of providers may allow for more accurate and fine-grained predictions (for example, aggregating data means that more combinations of procedures, policies, and so forth., are included in the data). In some embodiments, one or more systems may provide a denial probability and/or one or more predicted Claim Adjustment Reason Codes (CARCs) and/or Remittance Advice Remark Codes (RARCs). One or more of the systems may generate electronic flags or notifications of claims with a high probability of denial prior to submission. Provider systems may use said codes to generate instructions for intervening or modifying the claim prior to electronically submitting claims to the payer systems, thereby reducing the likelihood that the claims are denied.

In some embodiments, provider systems may attempt to revise and resubmit denied claims to the payer system for payment. However, provider systems may not have the resources to analyze or process the appeals for all of the denied claims. For example, for some providers or hospitals more than half of denials do not get reworked or resubmitted. As a result, provider systems may want to implement a customized solution for clustering denied claims and making automated decisions on which denied claims to process for appeal using predictive segmentation and smart resource allocation.

In some embodiments, one or more systems may apply a machine learning model to automatically segment denied claims into clusters and then determine which denied claims to revise and resubmit to the payer systems. In some embodiments, one or more of the systems may automatically categorize or rank denied claim data based on predetermined thresholds set by the provider systems, such as, for example, response timing, system resources, value, queue size, expiration timing, or other claim submission factors. In some embodiments, the one or more systems may generate a score or ranking that indicates a likelihood that a remediated claim will be paid and meet the pre-stored provider criteria. In some embodiments, the one or more systems may employ, for example, a joint probabilistic model that considers both the probability of overturning a denial and the likely revenue if the denial is overturned. The denial triage system may be configured to cluster, group, or categorize denied claims data so that the claims that meet the pre-stored provider criteria can be prioritized and automatically routed to additional processing systems or procedures, while denied claims data that do not meet the pre-stored provider criteria can be deprioritized, outsourced, and/or written off. In some embodiments, claims denial data may be automatically routed and fed into a model training system for building or tuning machine learning models to identify and correct problems with claims and to instruct provider systems to conduct automated decisioning and claims appeals for denied claims.

Artificial Intelligence/Machine Learning Claims System

FIG. 1 illustrates an example embodiment of an artificial intelligence (AD/machine learning (ML) claims system that includes an AI claims processing system 104 in communication over a network 101 with systems of hospitals, medical groups, doctors, and/or other clinicians, such as a hospital information system 102a or a practice management system 102b. In some embodiments, an AI claims processing system 104 may communicate with, for example, a hospital IT platform, a health information system (HIS), a practice management system (PMS), or the like. The AI claims processing system 104 may also be in electronic communication with one or more insurance systems, such as a private insurance system 103a, or a government insurance system 103b, such as a Medicare server.

While FIG. 1 shows a single hospital information system 102a, a single practice management system 102b, a single private insurance system 103a, and a single government insurance system 103b, it is recognized that in some embodiments, the claims processing system 104 could electronically communicate with multiple hospital information systems 102a, multiple practice management systems 102b, multiple private insurance systems 103a, and multiple government insurance systems 103b, as well as other systems. It is also recognized that the AI claims processing system 104 could be deployed internally within one or more of the hospital information systems 102a, the practice management systems 102b, the private insurance systems 103a, and/or the government insurance systems 103b.

In some embodiments, the AI claims processing system 104 may be part of or work with a system that receives and modifies electronic claims data, such as, for example, by applying one or more rule sets to the electronic claims data, performing data standardization processes to the electronic claims data, applying automated formatting processes to the electronic claims data, and/or generating claims submission data packages based on the electronic claims data.

AI/ML Claims Processing System

The exemplary AI/ML claims processing system 104 includes a claims data aggregation system 200 for processing large sets of electronic data (whether in structured or unstructured form) from multiple disparate sources as well as a model training system 300 for generating and tuning AI/ML models. The AI/ML claims processing system 104 also includes an AI/ML proactive claim processing system 400 that generates and deploys AI/ML models for predicting the likelihood that an electronic claim submission will be denied by the corresponding payer and the corresponding CARC. The AI/ML claims processing system 104 also includes an AI/ML reactive claim processing system 800 that generates and deploys AI/ML models for predicting the likelihood that an appealed or resubmitted electronic claim submission will be approved by the corresponding payer system and approved for an amount that meets a predetermined threshold, as well as automatically routing medical claims to workflow queues.

It is recognized that the AI/ML claims processing system may be implemented as one or more systems. For example, one system may implement the AI/ML proactive claim processing system 400 and another system may implement the AI/ML reactive claim processing system 800. As another example, one system may be configured with large processing power to generate the AI/ML models, while another system with more moderate processing power and a faster communications portal may be configured to deploy the AI/ML models such that it receives the request to apply the AI/ML models and returns the predicted responses from the AI/ML models with system components configured to provide a fast response time.

The AI/ML claims processing system 104 may also include a claims submission portal (not shown) for electronically sending claim submissions to payer systems over the network 101. However, it is recognized that in some embodiments, the AI/ML claims processing system 104 does not include a claims submission portal, but instead returns a response data package to a requesting system, such that the requesting system handles the electronic submissions and includes the claim submission portal or a similar communications portal. In other embodiments, the claims submission portal is included in the AI/ML proactive claim processing system 400 and/or in the AI/ML reactive claim processing system 800.

Network

The network 101 can comprise one or more networks, including, for example, a local area network (LAN), wide area network (WAN), and/or the Internet, for example, via a wired, wireless, or combination of wired and wireless, communication links. The network 101 can facilitate communication between the hospital information system 102*a*, the practice management system 102*b*, the private insurance system 103*a*, the government insurance system 103*b*, and/or the AI/ML claims processing system 104. The hospital information system 102*a* and/or the practice management system 102*b* can transmit (for example, wirelessly) or make electronically available electronic claims data to the AI/ML claims processing system 104. Additionally, the AI/ML claims processing system 104 can transmit (for example, wirelessly) or make electronically available electronic claims submission data client to the private insurance system 103*a* and/or the government insurance system 103*b* via the network 101. In some embodiments, AI/ML claims processing system 104 includes a user interface portal that allows the parameters to be submitted and stored in the AI/ML claims processing system 104. In some embodiments, the network 101 can be associated with (for example, operated by) one or more of the hospital information system 102*a*, the practice management system 102*b*, the private insurance system 103*a*, the government insurance system 103*b*, or the AI/ML claims processing system 104 (for an entity associated with the AI/ML claims processing system 104).

Data Aggregation System

Figure 2:
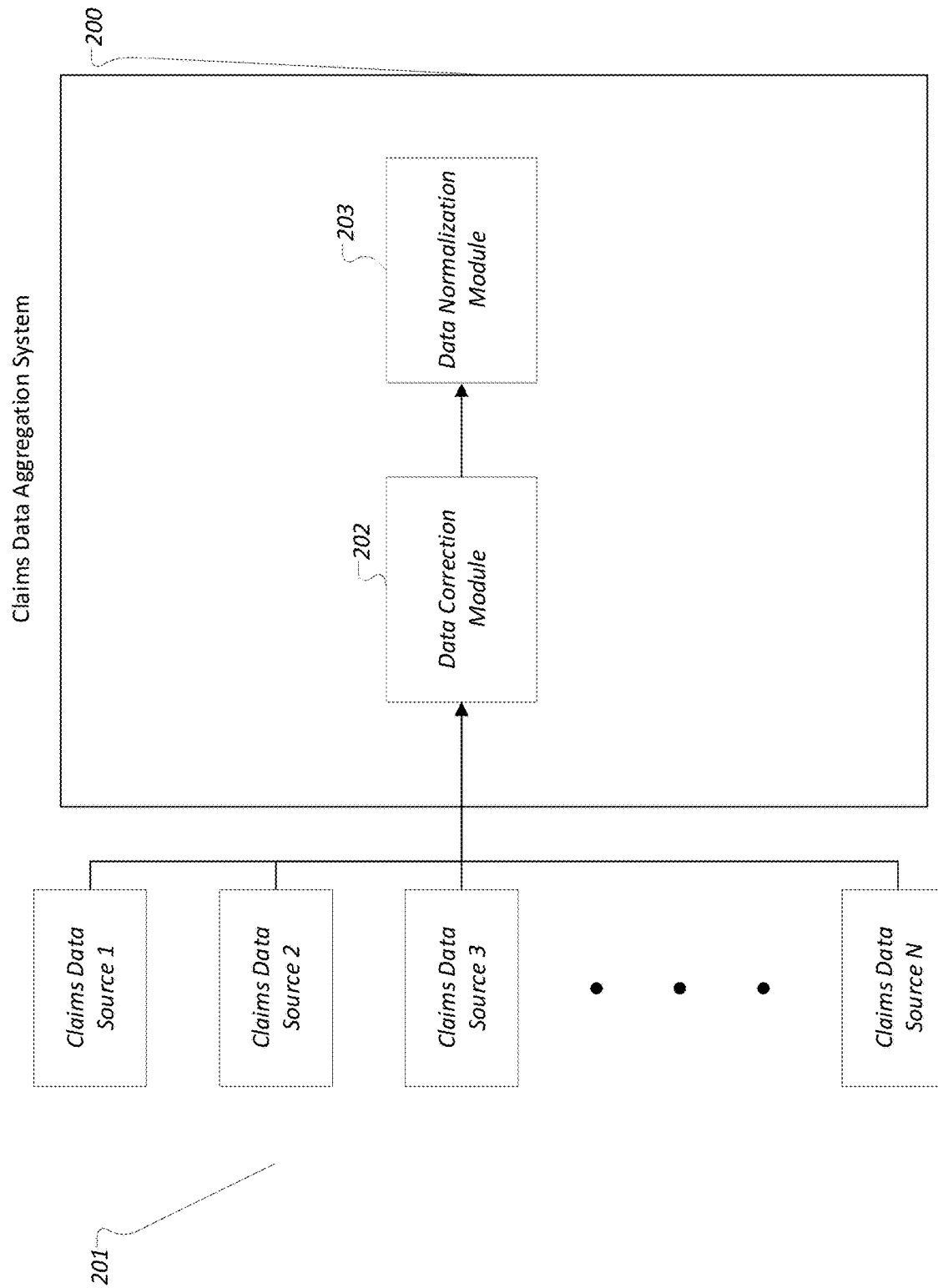
FIG. 2 is a diagram illustrating data aggregation from multiple sources according to an embodiment.

FIG. 2 is a diagram illustrating data aggregation from multiple sources such as, for example, by the claims data aggregation system 200 according to an embodiment. In some embodiments, claims data may come from a plurality of claims data sources 201 and/or from different systems. For example, claims data may come from systems associated with different hospitals, medical groups, solo practices, and the like. Also, remittance data, for example, may vary depending on payer and come from systems associated with different payers. In some embodiments, claims data and/or remittance data may have one or more errors or abnormalities that may be corrected automatically by the data correction module 202. In some embodiments, claims data may exist in a variety of formats. For example, in some embodiments, claims data may be stored in a relational database, provided in text-based files such as CSV or TSV files, or provided in a structured format such as JavaScript Object Notation (JSON) or XML. In some embodiments, the available fields, the formats of one or more fields, and/or the names of one or more fields may differ between claims data sources. In some embodiments, data from one or more claims data sources may be normalized by the data normalization module 203 such that the data conforms to a uniform format. For example, the claims data aggregation system 200 may implement one or more rule sets that are used to automatically modify the data without the need for human intervention. For example, one rule set may be associated with payer A such that the date of service should be in the YYYY-MM-DD format, whereas another rule set may be associated with payer B such that the date of service should be in the MM-DD-YYYY format. As another example, one rule set may be associated with payer C such that all procedures performed on a single date of service at a single location should be included in a single claims set and include instructions for aggregating procedure information, while another rule set associated with payer D may indicate that each procedure performed on a single date of service at a single location should be included in separate claims and include instructions for decoupling procedure information into individual procedures.

In some embodiments, the data aggregation system also includes a privacy module (not shown) that removes any personally identifiable data from the claims data, such as, for example, to prepare the claims data for use in generating an AI/ML model and using the claims data as training data. The privacy module may be configured to process the data according to one or more rule sets based on one or more regulations, including, for example, federal or state regulations. The privacy module may also apply an automated prioritization framework for resolving conflicts between privacy regulations.

Model Training System

Figure 3:
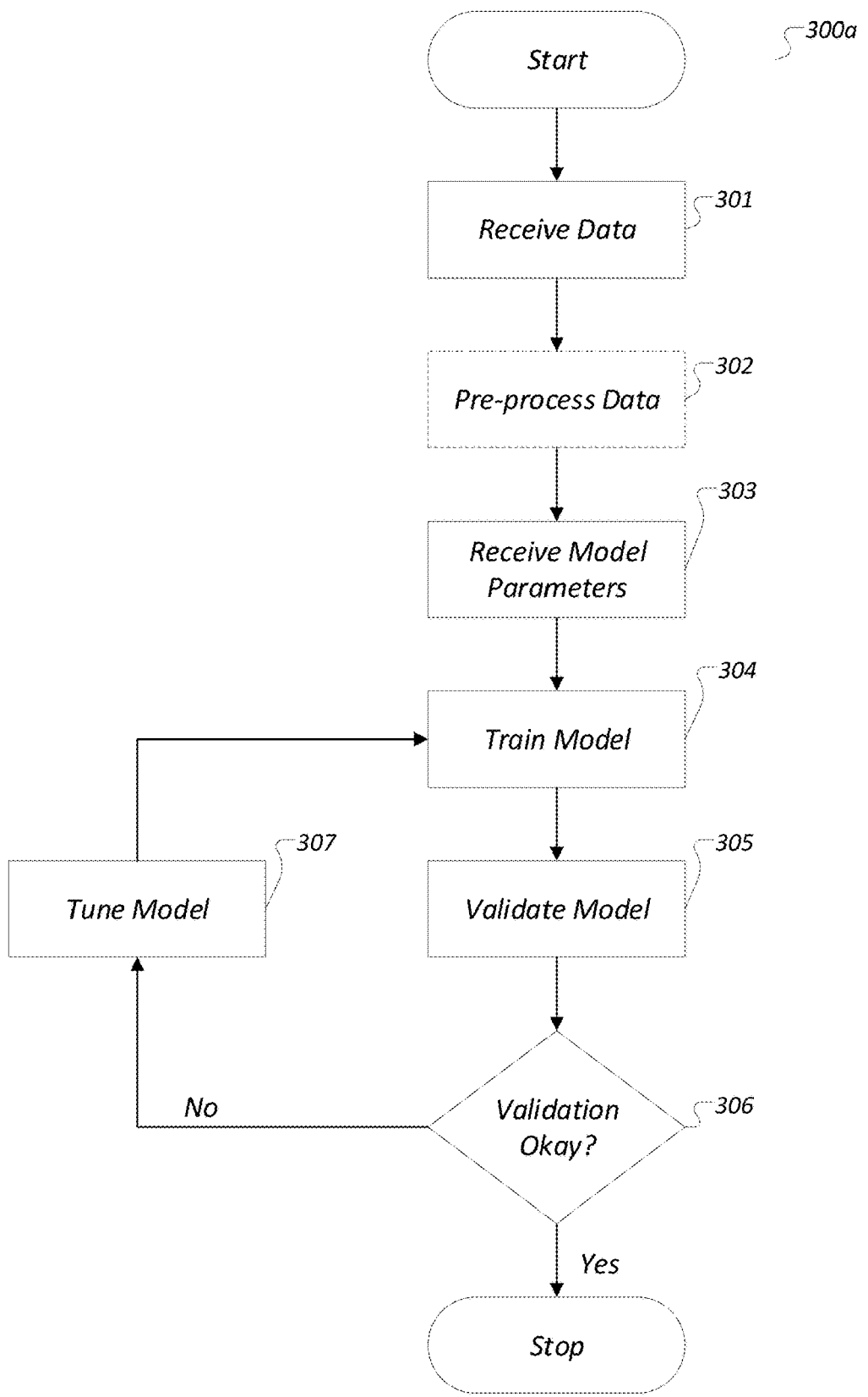
FIG. 3 is a diagram illustrating model training, validation, and tuning according to an embodiment.

FIG. 3 is a diagram illustrating a model generation process 300*a* that may be implemented by the model training system 300 for model training, validation, and tuning according to an embodiment. The model generation process 300*a* may be implemented in a system, such as, for example, the AI/ML claims processing system 104, the AI/ML proactive claim processing system 400, or the AI/ML reactive claim processing system 800. In some embodiments, at block 301 the system may receive electronic data packets which store, for example, claims data and/or remittance data. At block 302, the system may optionally perform pre-processing to extract the claims data and/or remittance data from the electronic data packets and apply one or more filters or parsing processes to access data items to be used in model training. In some embodiments, at block 303, the system may receive one or more model parameters which may be provided by, for example, a user of the system. For example, the model parameters may be provided to the system via a user interface and stored in a data store of the system. In some embodiments, the model may be trained at block 304 using the received (and optionally, pre-processed) claims data and/or remittance data and the received one or more model parameters. In some embodiments, the model training at block 304 may include artificial intelligence or machine learning such as neural networks, genetic algorithms, clustering, or the like. Machine learning may be performed using a training set of data. The training data may be used to generate the model that best characterizes a class of features of interest using the training data. In some embodiments, the class of features may be identified before training. In such embodiments, the model may be trained to provide outputs most closely resembling the target class of features. In some implementations, no prior knowledge may be used or available for training the data. In such instances, the model may discover new relationships for the provided training data. Such relationships may include similarities between data elements. At block 305, the model may undergo one or more validation analyses, and at decision block 306, a decision may be made to stop training or to continue training. Validation may be based on one or more of, for example, a false negative rate or a false positive rate. In some embodiments, if it is determined that training should be continued, the model may be tuned at block 307. The model may continue training until the model passes validation, where parameters and requirements for validation, error thresholds, or stopping criteria, may be provided to the system via a user interface and stored in a data store of the system. In some embodiments, the model training may be supervised, unsupervised, and/or partially supervised.

AI Proactive Claim Processing System

In some embodiments, a provider system may send an electronic claim request to the AI/ML proactive claim processing system 400 where the electronic claim request stores encrypted claims data for submission to a payer system for electronic processing of the claim request, where the stored claims data has one or more discrepancies or problems that could cause one or more claims in the electronic claim request to be denied by the payer system. It is recognized that the payer system may reject a claim request based on a variety of factors, some of which may be based on one or more objective criteria and/or one or more subjective criteria based on the thresholds and review conditions of the specific payer system. For example, in some embodiments, the payer system may automatically reject or deny the claim because of an error with the submitted claim data. The data may include, for example, a patient's personal information, such as, for example, the patient's address, date of birth, first name, middle name, last name, or other information that may be used to identify the patient. In some embodiments, the payer system may automatically reject or deny the claim because of an error with the patient's insurance information, such as an incorrect policy number. In some embodiments, the payer system may automatically reject or deny the claim because a procedure, test, or other medical intervention requires prior authorization or requires that other procedures be performed first. In some embodiments, the claims processing system may handle a large volume of claims from different health service provider systems which are to be submitted to a large number of different payer system, each with its own respective rules, nuances, and rejection parameters. The large volume of claims may make it impracticable for the provider systems to manually identify problems with and make corrections to claims.

In some embodiments, the AI/ML proactive claim processing system 400 may be deployed to automatically receive electronic claim data and automatically perform analytics and decisioning against a set of pre-stored client-specific rules applicable to one or more payment policies, which may trigger automated modifications to the claims data and/or automated alerts for possible modifications to the claims data which would decrease the likelihood of the claim being denied by the associated payer. In some embodiments, an AI/ML proactive model may be generated and deployed to predict the likelihood of a claim being denied by a specific payer and the predicted CARC, and/or to identify possible issues with a claim before the claim is submitted for payment. In some embodiments, the AI/ML proactive claim processing system 400 may train an artificial intelligence or machine learning model using data from a single provider to generate an AI/ML proactive model. In some embodiments, the AI/ML proactive claim processing system 400 may train the AI/ML proactive model using data from multiple providers, such as by aggregating the data and/or removing personally identifiable data to create a training data set and/or replacing the personally identifiable data with a unique identifier or other marker. In some embodiments, the training data set may include depersonalized data such that an AI/ML proactive model can be generated based on the data from multiple providers. In such an embodiment, the AI/ML proactive claim processing system 400 may apply the AI/ML proactive model to claim submission data from a provider that has never submitted a claim to a specific payer and the provider can receive predictions of the likelihood that the claims will be denied and the corresponding CARC based on the historical denials of other providers submitting claims to the same payer. In other embodiments, the AI/ML proactive model can be generated and tuned using only the historical claims data of a specific provider. In such an embodiment, the AI/ML proactive claim processing system 400 may apply the AI/ML proactive model to claim submission data from a provider so that the provider receives predictions of the likelihood that the claims will be denied and the corresponding CARC based on the provider's own historical denials by the same payer. In some embodiments, the AI/ML proactive claim processing system 400 may apply the AI/ML proactive model to claim submission data from a provider so that the provider receives predictions of the likelihood that the claims will be denied and the corresponding CARC based on both the historical denials of other providers who have submitted claims to the same payer and on the provider's own historical denials by the same payer.

In some embodiments, the AI/ML proactive claim processing system 400 may have access to an ensemble of AI/ML proactive models associated with different providers. The AI/ML proactive claim processing system 400 may access a set of provider claims data and apply a subset of the ensemble of AI/ML proactive models to the set of provider claims data based on the potential payers associated with the claims. The AI/ML proactive claim processing system 400 may determine that a specific claim may be associated with more than one potential payer (for example, if a patient has both government insurance and private insurance), run the AI/ML proactive models for all of the potential payers, and apply analytics and decisioning to select a payer system for a specific claim based on the scores returned from the AI/ML proactive models for the potential payers.

In some embodiments, one or more components of the AI/ML proactive claim processing system 400, including, for example, the AI/ML proactive model, may be deployed or installed at the provider's office, a data center, or the like. In some embodiments, the AI/ML proactive model may be run by a third-party system and accessed by the provider system using, for example, a software as a service model.

AI/ML Proactive Model Generation and Deployment

Figure 4:
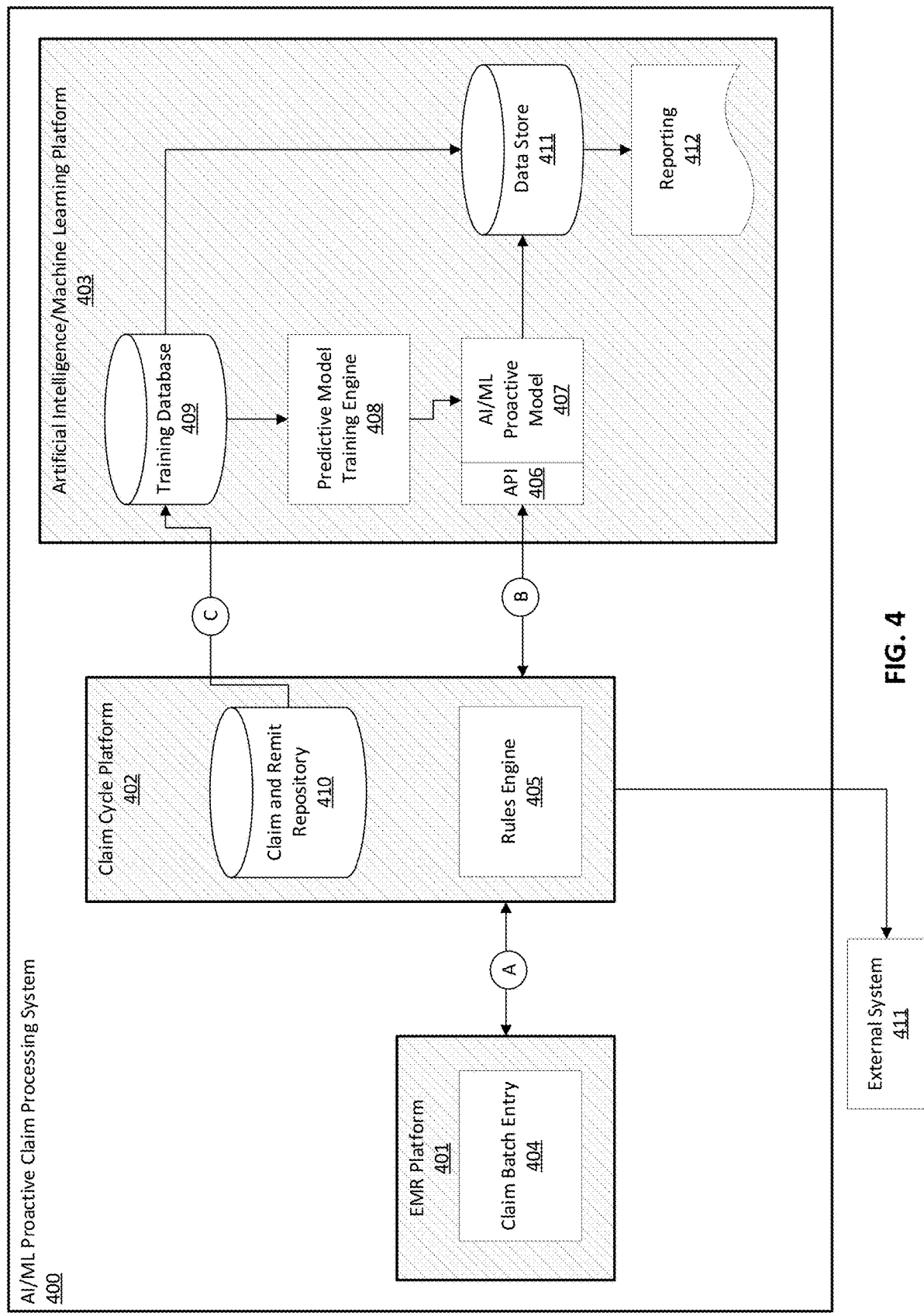
FIG. 4 is a diagram illustrating the use of an AI/ML proactive model according to an embodiment.

FIG. 4 is a diagram illustrating the use of an AI/ML proactive model 407 as part of a claim submission system 400 according to an embodiment. In some embodiments, the claim submission system 400 may comprise an electronic medical record (EMR) platform 401, a claim cycle platform 402, and an artificial intelligence/machine learning platform 403 (for example, a proactive claims denial system). At block 404, an electronic set of batched claim data may be accessed or entered using the EMR platform 401. At (A), the EMR platform 401 may be in electronic communication with a claim cycle platform 402. The claim cycle platform 402 may comprise a rules engine 405 and a claim and remit repository 410. The claim cycle platform 402 may access electronic claim batch data from the EMR platform 401. The rules engine 405 may apply one or more real-time modifications to the electronic claim batch data. The electronic claim batch data may be stored in claim and remit repository 410. At (B), the claim cycle platform 402 may provide information about a set of claims to the artificial intelligence/machine learning platform 403 using an API 406 in communication with the AI/ML proactive model 407.

In some embodiments, the artificial intelligence/machine learning platform 403 may then apply an ensemble of AI/ML proactive models to the set of claims based on a provider associated with each of the claims to generate predictions for the likelihood of the claims being denied by the respective payer(s) and the corresponding CARC(s). The artificial intelligence/machine learning platform 403 may then, through the API 406, provide an electronic set of results data back to the claim cycle platform 402. The electronic set of results data may include, for example, one or more predicted denial reason indicators, one or more predicted denial probability indicators, and/or one or more problems with the set of claims. In some embodiments, the artificial intelligence/machine learning platform 403 or the claim cycle platform 402 may perform automated updating to change or modify some of the claims and/or automated routing to send some of the claims to a workflow queue for additional review or processing. The artificial intelligence/machine learning platform 403 or the claim cycle platform 402 may provide an output data package with the one or more predicted denial reason indicators and/or predicted denial probability indicators to an external system 411 which may be, for example, a provider system for ordering additional required services or a claim review system for conducting an additional review. The claim cycle platform 402 may generate electronic claim submissions packages for claims data associated with one or more provider systems where the likelihood of denial is below a pre-stored threshold and then initiate the transfer of the electronic claim submissions packages to the respective payer systems, such as insurance processing systems. The transfer may be via API calls or other communication interfaces of the payer systems. In some embodiments, the artificial intelligence/machine learning platform 403 and/or the claim cycle platform 402 may store the electronic set of results data, or a subset thereof, in a data store such as, for example, data store 411 or claim and remit repository 410.

In some embodiments, at (C), the claim and remit repository 410 may provide claim remit data to a training database 409 of the artificial intelligence/machine learning platform 403 to implement a feedback loop. In some embodiments, the claim remit data may be provided to the training database 409 on a predetermined schedule, such as nightly, hourly, bi-weekly, and so forth, and/or the claim remit data may be provided to the training database 409 automatically upon determination that a predetermined threshold has been met, such as, for example, a calculation of the indication of the staleness of the training data stored in the training database 409, an accuracy threshold preset by the provider, or an amount of historical claims data that has not been transferred to the training database 409. At block 408, the proactive model training engine 408 determines which payer systems are associated with the claim remit data and uses the training data to generate new AI/ML proactive models or to train an existing AI/ML proactive model 407. The artificial intelligence/machine learning platform 403 may store parameters and criteria for the providers that are then used to generate, tune, and determine whether to deploy the AI/ML proactive models. In some embodiments, the training data 409 may be available to the tracking data store 411. The artificial intelligence/machine learning platform 403 may use the tracking data store 411 to generate automated alerts or electronic reports 412 that can be made accessible to one or more systems or configured and packaged to be provided and displayed in one or more user interfaces.

It is recognized that the embodiments discussed herein are not limiting and that other embodiments may be implemented. For example, in some embodiments, the artificial intelligence/machine learning platform 403 may use the training data 409 to generate one or more rules, and the API 406 may be used to provide the one or more rules to the claim cycle platform 402 for use by the rules engine 405.

AI/ML Proactive Model User Interface

Figure 5:
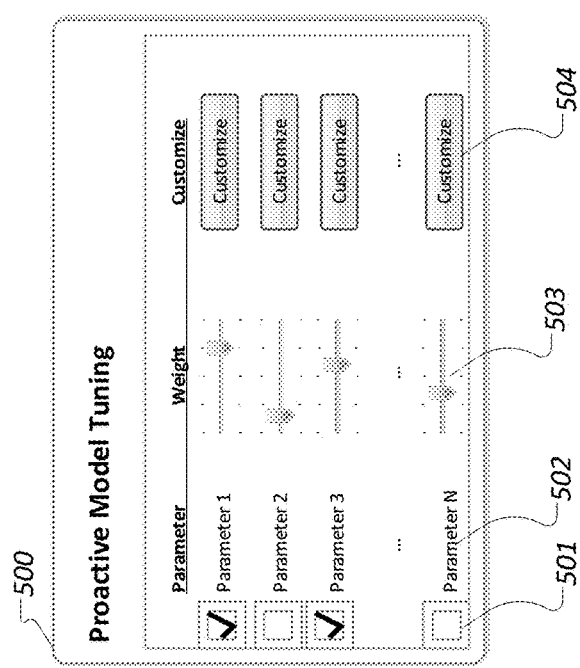
FIG. 5 is an example user interface for configuring an AI/ML proactive model according to an embodiment.

FIG. 5 is an example user interface for providing user interface elements to allow a user to submit configuration parameters or criteria for generating, training, tuning, and/or deploying the AI/ML proactive model 407 according to an embodiment. In the example interface depicted, users may, using the checkboxes 501, enable or disable one or more parameters or criteria 502. In some embodiments, users may wish to adjust the relative importance of one or more parameters by adjusting one or more weights 503. In some embodiments, users may wish to perform additional parameter customizations which may, for example, be accomplished by clicking the buttons 504 which may trigger the user interface to present additional configuration options to the user. In some embodiments, parameters may be, for example, specific parameters of interest such as claim amount, type of procedure, insurance company, or the like, or may be an overall adjustment such as, for example, a false positive rate or a false negative rate. Some providers, may, for example, have a higher risk tolerance or fewer in-house resources and may prefer to submit claims that another, less risk-tolerant or better-resourced provider would want to modify before submission. In some embodiments, the user may designate that the configuration parameters or criteria may apply to all of the payers associated with the provider's claims, whereas in other embodiments, the user may designate different configuration parameters or criteria for different payers, for different time periods, for different type of claims, for different procedure criteria, and so forth. The parameters may allow the users to perform self-service model threshold tuning based on provided factors to meet the provider's risk tolerances.

The AI/ML proactive claim processing system 400 may store the parameters in a data store of the AI/ML proactive claim processing system 400, such as the training database 409. It is recognized that different providers or groups of providers may have different parameters. In addition, as noted above, a single provider may have different parameters for different payers, different subsets of the claims data (for example, claims for services within a certain time frame versus services within a different time frame, claims for services associated with a first dollar value versus services associated with a different dollar value) or for different divisions of the provider (for example, different parameters for Emergency Room claims versus scheduled outpatient claims, different parameters for orthopedic department claims versus obstetrics department claims).

AI/ML Proactive Model Deployment Process

Figure 6:
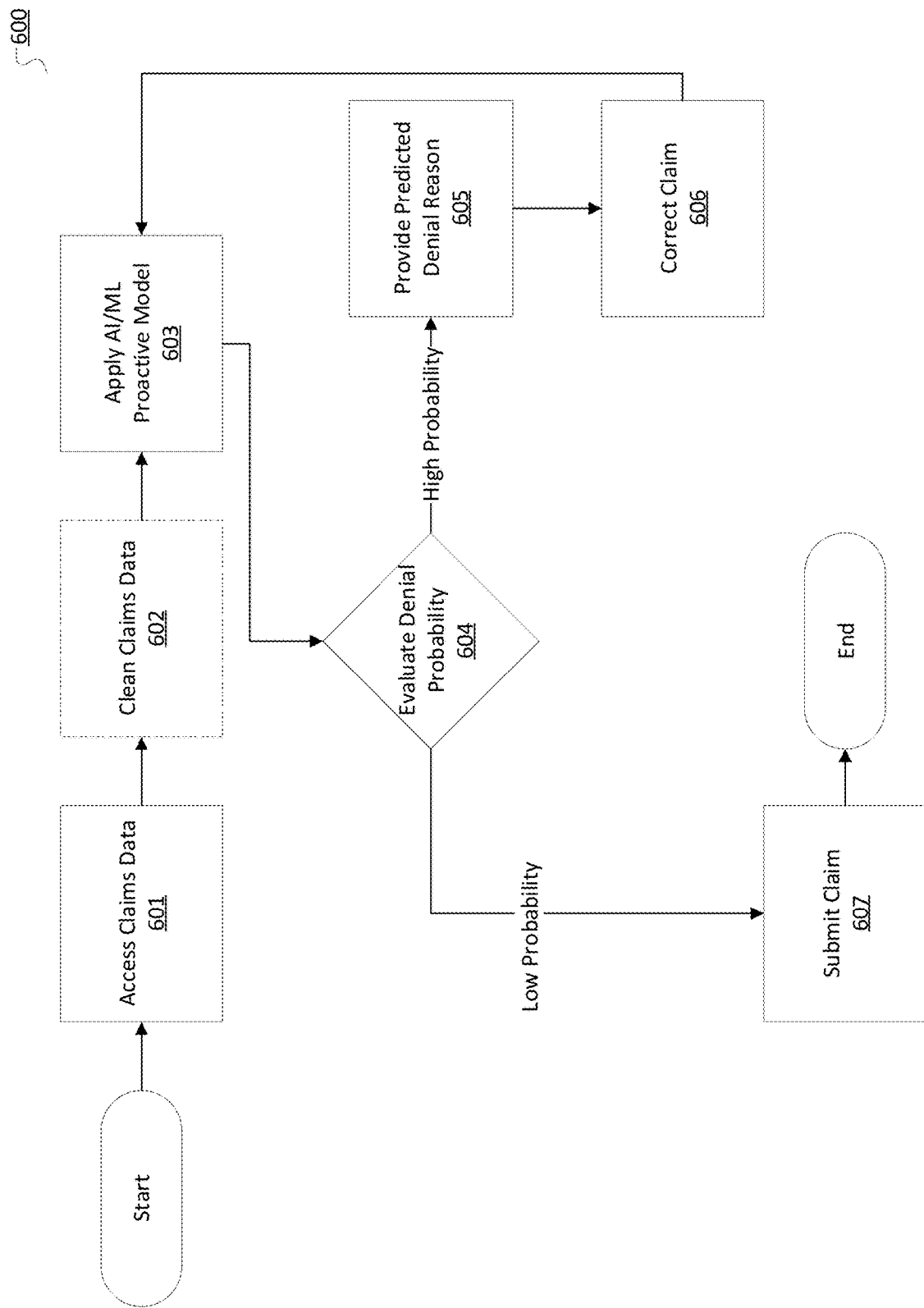
FIG. 6 is a diagram illustrating the use of an AI/ML proactive model according to an embodiment.

FIG. 6 is a diagram illustrating a process 600 for deploying an AI/ML proactive model according implemented by an AI/ML proactive system according to an embodiment. The AI/ML proactive system may be, for example, the AI/ML claims processing system 104 or the AI/ML proactive claim processing system 400. At block 601, the system may access a set of electronic claims data. The electronic claims data may include a single claim or a set of claims. Moreover, the electronic claims data may include claims data for a single payer system or for multiple payer systems. At block 602, the system may optionally clean the electronic claims data by applying one or more transformations or modifications to the electronic claims data. At block 603, the system may feed the electronic claims data into the deployed AI/ML proactive model. The deployed AI/ML proactive model may then determine a probability of denial of one or more claims in the electronic claims data. At block 604, if the probability of denial of one or more claims in the electronic claims data is over or under a certain threshold, which may, in some embodiments, be defined by providers associated with the electronic claims data, the system may flag the corresponding electronic claims data and provide a score or indicator of the likelihood of denial, along with one or more predicted denial reasons (e.g., CARCs) at block 605 so that flagged electronic claims data may be corrected at block 606, wherein correcting the claim batch may be done automatically, partially automatically, or with user input via one or more user interfaces. After the claim batch is corrected automatically, by a user of the system, or a combination of both, the AI/ML proactive model may then re-evaluate the probability of rejection of the flagged electronic claims data at block 603. If a subset of the flagged electronic claims data still has a high denial probability, the system may determine one or more predicted denial reasons at block 605 and the subset of the flagged electronic claims data may again be corrected at block 606. At block 604, if the flagged electronic claims data does not have a high denial probability, the flagged electronic claims data may, at block 607, be electronically submitted by the system to one or more payer processing systems which may be, for example, the private insurance system 103a and/or the government insurance system 103b. In some embodiments, a user may be able to submit a claim via one or more user interfaces even though the denial probability is high. In some embodiments, the system may be configured to submit a claim after a maximum number of correction attempts even if the claim still has a high denial probability.

AI/ML Proactive Model Deployment User Interface

FIG. 7 is an example user interface for displaying one or more potential denial reasons of a flagged claim to a user according to an embodiment. In the example interface depicted, users may be shown a claim submission view 700 which may include a data band 701 comprising information about the patient and/or information about the patient's insurance. The data band 701 may include an indicator that there may be one or more potential issues with the data in the data band 701 that could result in claim denial such as, for example, an incorrect name, an invalid address, an invalid insurance policy number, an expired insurance policy, or the like. The claim submission view 700 may further comprise a list of claim items 702 such as, for example, procedures, medical supplies, medications, hospital room charges, and the like. The list of claim items 702 may include one or more indicators for each of the one or more claim items indicating that there may be one or more issues with claim items that may result in claim denial. The claim submission view 700 may further comprise a denial view 703 which may comprise denial probability scores 704, denial reason descriptions 705, radio buttons 706, and severity indicators 707. In some embodiments, the severity indicators 707 may change based on the denial probability scores 704. For example, in some embodiments, if the denial probability score 704 is above a threshold which may be a default value, a user-configured value, or some other value (for example, 80%), the severity indicator 707 may be set to red "x," a red circle, or some other indication that an issue is highly likely to result in denial of the claim. Issues that have denial probability scores 704 below the threshold may have a severity indicator 707 comprising a yellow circle, a caution sign, or some other indication that an issue exists but that the denial probability score 704 is below the threshold. In some embodiments, the radio buttons 706 may comprise options to revise, ignore, and/or withdraw claims or claim items.

It is recognized that these are merely examples, and a user may be presented with a different interface that may be used to accomplish substantially the same or similar tasks and to view substantially the same or similar information. In some embodiments, a user interface may present a user with more, fewer, different, or the same options and may arrange the options differently such as, for example, using a tabbed interface, modal windows, or the like. For example, in some embodiments, the user interface may not give users an option to remove a claim item, or the user interface may present an overall indicator that corresponds to multiple claim items associated with the same procedure, admission, and so forth. In some embodiments, the system may evaluate updated claims and/or claim items in substantially real time to determine updated denial probabilities and/or denial reasons. In other embodiments, the system may wait until the user indicates that they have completed editing the claim submission before evaluating the updated claims and/or claim items.

AI/ML Reactive Claim Processing System

In some embodiments, after the payer systems have received the electronic claims data, the payer systems, such as insurance company systems, government payer systems, or other types of payer systems, may process the electronic claims data and generate an indication of claim denial or approval for each claim or claim element. The payer systems may send the indications of denial or approval back to the provider system or the submitting system. In some embodiments, a payer system may deny a claim in whole or in part. For example, a payer system may deny a claim because of a minor error that can be easily identified and corrected, such as an error in the patient's personal information and/or the patient's insurance information. In some embodiments, a payer system may deny a claim because of the claim contained an incorrect International Statistical Classification of Diseases and Related Health Problems 10th Revision (ICD-10) code or the like. In some embodiments, a payer system may deny a claim because the procedure, treatment, or other intervention is not approved for the patient because of the patient's age or gender. For example, in some embodiments, a payer system may deny a claim because a procedure or treatment is only approved for someone over or under a certain age. In some embodiments, a payer system may deny a claim because the provider did not obtain prior authorization. In some embodiments, a payer system may deny a claim because the patient's insurance policy requires that other treatments, tests, procedures, or the like be performed before the treatment, test, or procedure that was performed and submitted for payment.

In some embodiments, a provider may correct a denied claim resubmit the denied claim for processing. In some embodiments, correcting the denied claim may be done automatically, partially automatically, or manually. In some embodiments, a provider may choose to write off a claim because, for example, it is likely that the claim will be denied if it is resubmitted or because the amount likely to be recovered is less than the expense of correcting and resubmitting the denied claim. In some embodiments, a provider may outsource denied claims to a third party for remediation. For example, a provider may choose to outsource remediation for claims that are likely to yield returns below a certain threshold.

In some embodiments, the AI/ML reactive claim processing system 800 may be deployed to automatically receive electronic claim remit data and automatically perform analytics and decisioning against a set of pre-stored client-specific rules applicable to one or more payment policies, which trigger automated modifications to the claims data and/or automated alerts for possible modifications to the claims data or additional procedures or services that are ordered or requested for the patient that, if performed, would increase the likelihood of the claim being approved upon resubmission.

In some embodiments, the AI/ML reactive claim processing system 800 may have access to an ensemble of AI/ML reactive models associated with different providers. The AI/ML reactive claim processing system 800 may access a set of provider claims data and apply a subset of the ensemble of AI/ML proactive models to the set of provider claims data based on the potential payers associated with the claims. The AI/ML reactive claim processing system 800 may determine that a specific claim may be associated with more than one potential payer, run the AI/ML reactive models for all of the potential payers, and apply analytics and decisioning to select a payer system for a specific claim based on the scores returned from the AI/ML reactive models for the potential payers.

In some embodiments, an AI/ML reactive model may be generated and deployed to predict the likelihood of a claim being approved by a specific payer after resubmission and/or to identify possible issues with a claim before the claim is resubmitted for payment. In some embodiments, the AI/ML reactive claim processing system 800 may train an artificial intelligence or machine learning model using data from a single provider to generate an AI/ML reactive model. In some embodiments, the AI/ML reactive claim processing system 800 may train the AI/ML reactive model using data from multiple providers, such as by aggregating the data and/or removing personally identifiable data to create a training data set and/or replacing the personally identifiable data with a unique identifier or other marker. In some embodiments, the training data set may include depersonalized data such that an AI/ML reactive model can be generated based on the data from multiple providers. In such an embodiment, the AI/ML reactive claim processing system 800 may apply the AI/ML reactive model to claim remit data that has been earmarked as denied from a provider that has never resubmitted a claim to a specific payer and the provider can receive predictions of the likelihood that the claims will be approved upon resubmission based on the historical approvals of other providers resubmitting claims to the same payer. In other embodiments, the AI/ML reactive model can be generated and tuned using only the historical claims data of a specific provider. In such an embodiment, the AI/ML reactive claim processing system 800 may apply the AI/ML reactive model to denied claim remit data from a provider so that the provider receives predictions of the likelihood that the claims will be approved after resubmission based on the provider's own historical approval by the same payer. In some embodiments, the AI/ML reactive claim processing system 800 may apply the AI/ML reactive model to claim submission data from a provider so that the provider receives predictions of the likelihood that the claims will be denied based on both the historical denials of other providers who have submitted claims to the same payer and on the provider's own historical denials by the same payer.

The AI/ML reactive claim processing system 800 may also cluster the denied claim remit data to apply automated priorities to the resubmissions using predictive segmentation and smart resource allocation. In addition, the AI/ML reactive claim processing system 800 may automatically generate workflow requests and place or submit them to workflow queues.

In some embodiments, one or more components of the AI/ML reactive claim processing system 800, including, for example, the AI/ML reactive model, may be deployed or installed at the provider's office, a data center, or the like. In some embodiments, the AI/ML reactive model may be run by a third-party system and accessed by the provider system using, for example, a software as a service model.

AI/ML Reactive Model Generation and Deployment

Figure 8:
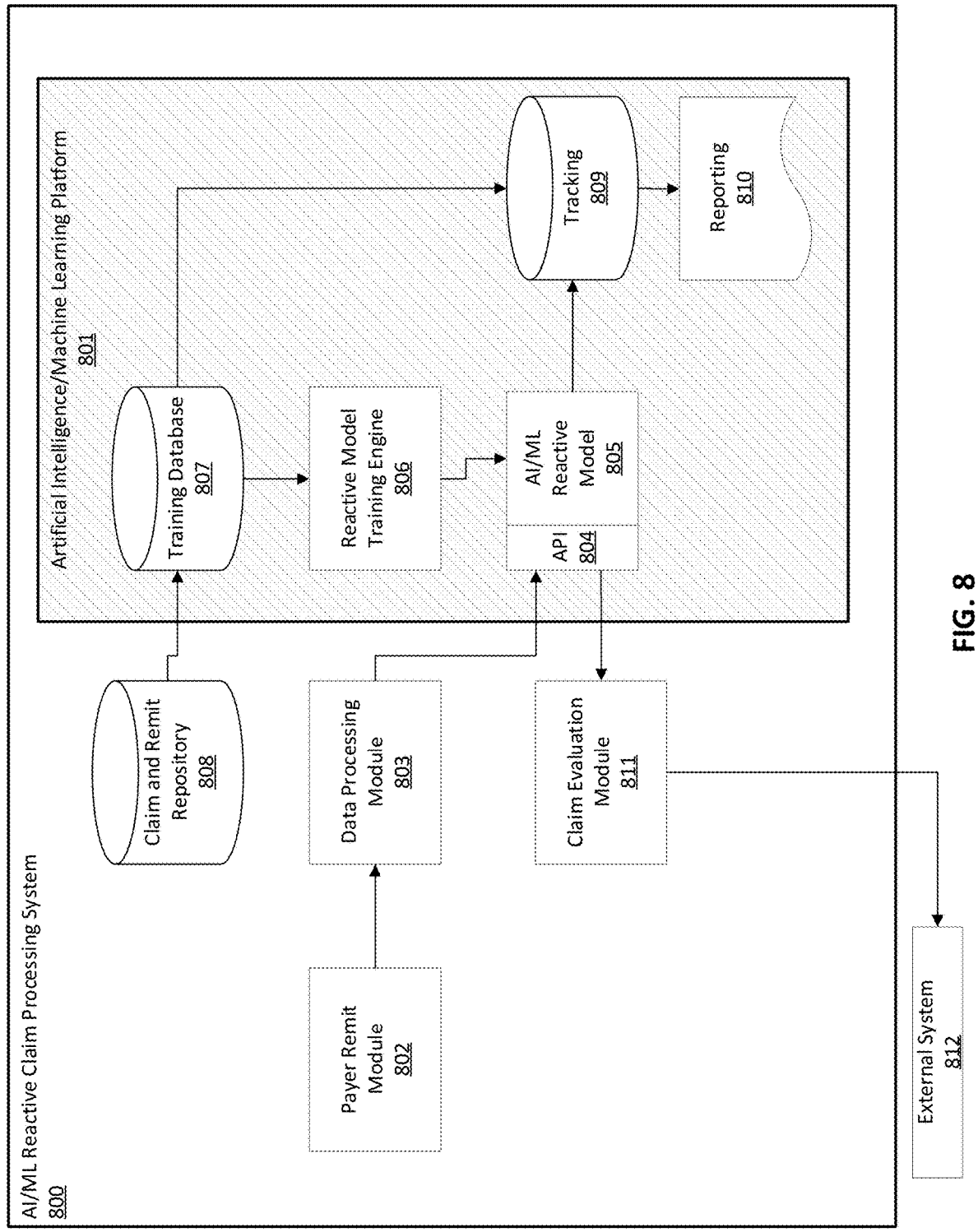
FIG. 8 is a diagram illustrating the use of an AI/ML reactive model reactive claim denial triage model according to an embodiment.

FIG. 8 is a diagram illustrating the use of an AI/ML reactive model 805 as part of an AI/ML reactive claim processing system 800 according to an embodiment. In some embodiments, the AI/ML reactive claim processing system 800 may comprise an artificial intelligence/machine learning platform 801.

A payer remit module 802 of the AI/ML reactive claim processing system 800 may access one or more payer remits within an electronic set of claim remit data, which may be preprocessed by the data processing module 803 and then transferred to the artificial intelligence/machine learning platform 801 via an API 804. In some embodiments, the artificial intelligence/machine learning platform 801 may then apply an ensemble of AI/ML reactive models 805 to the set of preprocessed data based on a provider associated with each of the denied claims to generate predictions for the likelihood of the claims being approved by the respective provider(s) upon resubmission. For example, the AI/ML reactive model 805 may, using the API 804, provide an electronic set of claim evaluation results to the claim evaluation module 811 indicating a subset of the claims in the payer remits which were denied along with one or more of a likelihood of successful remediation, an expected payment amount, or one or more recommended remediation actions, which may then be provided to an external system 812.

In some embodiments, one or more components of the AI/ML reactive claim processing system 800, such as, for example the artificial intelligence/machine learning platform 801, may perform automated updating to change or modify some of the denied claims and/or automated routing to send some of the claims to a workflow queue for additional review or processing. The AI/ML reactive claim processing system 800 may provide an output data package with the one or more predicted reason indicators, other requested parameters (such as, for example, time and costs parameters), and/or a predicted approval probability indicator to an external system 812 which may be, for example, a provider system for ordering additional required services or a claim review system for conducting an additional review.

The AI/ML reactive claim processing system 800 may cluster the denied claims based at least in part on the predicted approval probability indicator and the other requested parameters to generate one or more clusters, such as, for example, clusters for write-offs, clusters for immediate processing and resubmission, and/or clusters for potential processing and resubmission. The AI/ML reactive claim processing system 800 may generate workflow requests and populate workflow queues based on the one or more clusters.

For denied claims to be resubmitted, the AI/ML reactive claim processing system 800 may generate electronic claim resubmission packages with denied claims data associated with one or more provider systems, where the likelihood of approval is above a pre-stored threshold and then initiate the transfer of the electronic claim resubmission packages to the respective payer systems, such as insurance processing systems. The transfer may be via a call to APIs or other communication interfaces of the payer systems. In some embodiments, the AI/ML reactive claim processing system 800 may store the electronic set of results data, or a subset thereof, in a data store, such as, for example training database 807, tracking data store 809, or claim and remit repository 808.

The external system 812 may be used to, for example, rework and resubmit denied claims or to process resubmitted claims.

In some embodiments, the claim and remit repository 808 may provide claim remit data and/or claim resubmission data to a training database 807 of the artificial intelligence/machine learning platform 801 to implement a feedback loop. The AI/ML reactive model 805 may be trained using a reactive model training engine 806 that is trained using data from training database 807. The training database 807 may be based on a claim and remit repository 808. The claim and remit repository 808 may provide data to the training database 807 on a regular basis such as, for example, nightly, hourly, bi-weekly, and so forth, and/or the claim and remit repository 808 may provide data to the training database 807 automatically upon determination that a predetermined threshold has been met such as, for example, a calculation of the indication of the staleness of the training data stored in the training database 807, an accuracy threshold preset by the provider, or an amount of historical data that has not been transferred to the training database 807. The reactive model training engine 806 may determine which payer systems are associated with the claim remit data and use the training data to generate new AI/ML reactive models or to train an existing AI/ML reactive model 805. The artificial intelligence/machine learning platform 801 may store parameters and criteria for the providers that are then used to generate, tune, and determine whether to deploy the AI/ML reactive models. The artificial intelligence/machine learning platform 801 may store one or more results in the tracking data store 809. The artificial intelligence/machine learning platform 801 may use the tracking data store 809 to generate automated alerts or electronic reports 810 that can be made accessible to one or more systems or configured and packaged to be provided and displayed in one or more user interfaces.

It is recognized that the embodiments discussed herein are not limiting and that other embodiments may be implemented. For example, in some embodiments, the artificial intelligence/machine learning platform 801 may use the training database 807 to generate one or more rules, and the API 804 may be used to provide the one or more rules for use by other components of the AI/ML reactive claim processing system 800.

AI/ML Reactive Model Generation User Interface

Figure 9:
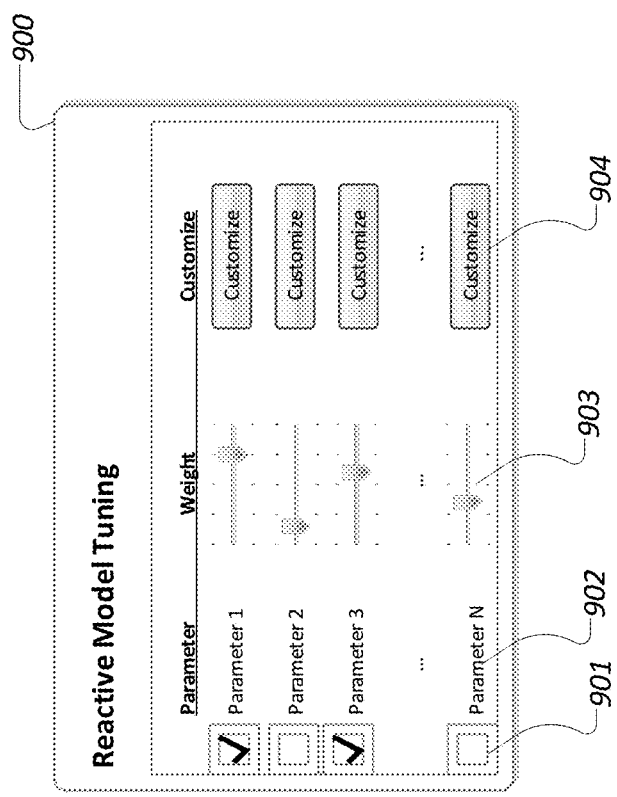
FIG. 9 is an example user interface for configuring an AI/ML reactive model according to an embodiment.

FIG. 9 is an example user interface for providing user interface elements to allow a user to submit configuration parameters or criteria for generating, training, tuning, and/or deploying the AI/ML reactive model 805 according to an embodiment. In the example interface depicted, users may, using the checkboxes 901, enable or disable one or more parameters or criteria 902. In some embodiments, users may wish to adjust the relative importance of one or more parameters or criteria by adjusting one or more weights 903. In some embodiments, users may wish to perform additional parameter customizations which may, for example, be accomplished by clicking the buttons 904 which may cause the system to show additional configuration options to the user. In some embodiments, parameters may be, for example, specific parameters of interest such as claim amount, insurance company, or type of procedure, or may be an overall adjustment such as, for example, a false positive rate or a false negative rate. For example, providers may wish to deprioritize claims that were submitted to insurance companies that have high denial rates for corrected and resubmitted claims or where time since the date of services has met a pre-determined threshold. In some embodiments, the user may designate that the configuration parameters or criteria may apply to all of the payers associated with the provider's claims, whereas in other embodiments, the user may designate different configuration parameters or criteria for different payers, for different time periods, for different type of claims, for different procedure criteria, and so forth.

The AI/ML reactive claim processing system 800 may store the parameters in a data store of the AI/ML reactive claim processing system 800, such as the training database 807. It is recognized that different providers may have different parameters. In addition, as noted above, a single provider may have different parameters for different payers, different subjects of the remit data (for example, remits for services within a certain time frame versus services within a different time frame, remits for services associated with a first dollar value versus services associated with a different dollar value) or for different divisions of the provider (for example, different parameters for remits related to Emergency Room services versus schedule outpatient procedures, different parameters for remits related to orthopedic services versus obstetrics services).

AI/ML Reactive Model Deployment Process

Figure 10:
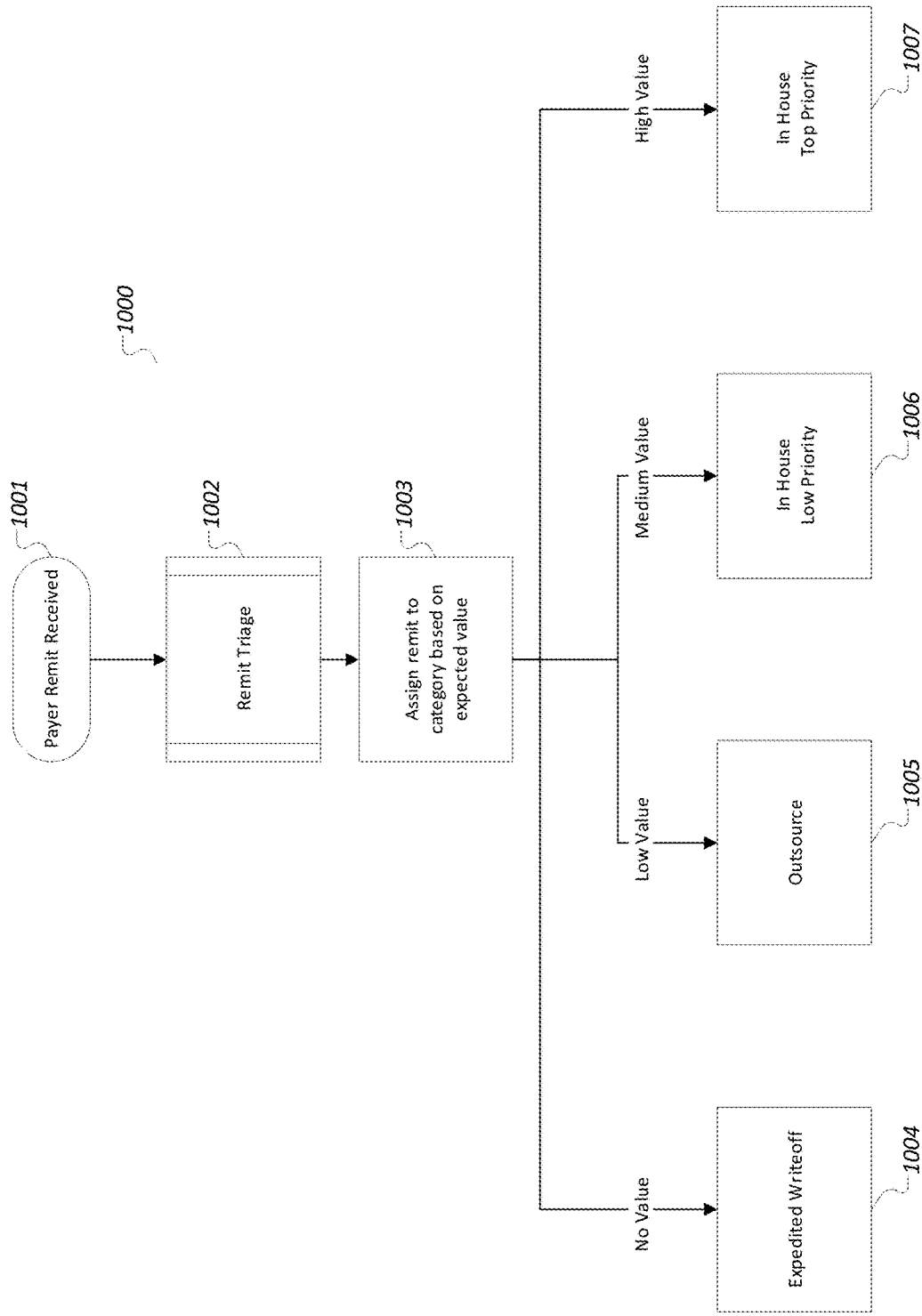
FIG. 10 is a diagram illustrating the use of an AI/ML reactive model according to an embodiment.

FIG. 10 is a diagram illustrating a process 1000 for deploying an AI/ML reactive model by an AI/ML reactive system according to an embodiment. The AI/ML reactive system may be, for example, the artificial intelligence/machine learning platform 801 or another component of the AI/ML reactive claim processing system 800. At block 1001, the system may receive or access payer remit data and provide such data to a remit triage system 1002 which may be, for example, the AI/ML claims processing system 104 or the AI/ML reactive claim processing system 800. Based on the results provided by the remit triage system 1002, the remit may, at block 1003, be clustered and assigned to a cluster based at least in part on the expected approval success and/or value of the claim. For example, at block 1004, the system may be configured to write off claims with no expected value even if the claims have a high expected approval success. At block 1005, the system may be configured to outsource claims with lower expected value for rework and resubmission. As another example, claims with a moderate expected approval success, an expected high value, and with permissions to be processed by a third party may be assigned to a cluster and automatically submitted to an outsource provider processing queue. At block 1006, the system may be configured to retain for rework and resubmission by the provider and assign a low priority to claims with medium expected value. For example, these claims could be assigned to a lower priority cluster and automatically submitted to an internal processing queue. At block 1007, the system may be configured to prioritize, for rework and resubmission by the provider, claims with high expected value. As an example, these claims could be assigned to a higher priority cluster and automatically submitted to an internal processing queue and flagged for priority review.

In some embodiments, one or more of the clusters may be processed and then the claim data electronically may be resubmitted by the system to one or more payer processing systems which may be, for example, the private insurance system 103a and/or the government insurance system 103b.

In some embodiments, a user may be able to submit a claim via one or more user interfaces even though the resubmission approval probability is low. In some embodiments, the system may be configured to submit a claim after a maximum number of resubmission attempts even if the claim still has a low resubmission approval probability.

AI/ML Reactive Model Deployment User Interface

Figure 11:
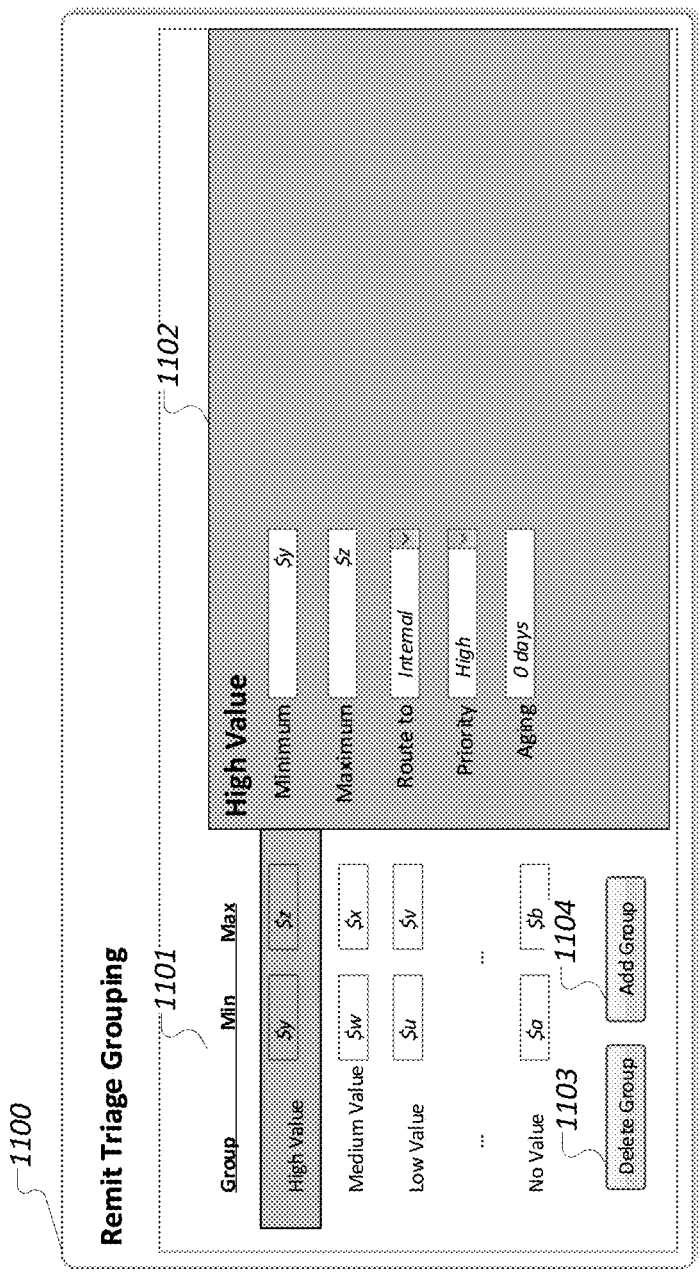
FIG. 11 is an example user interface for configuring rules to assign claims to groups according to an embodiment.

FIG. 11 is an example user interface that allows a user to configure rules or parameters or criteria to assign claims to clusters according to an embodiment. In the example interface depicted, users may be shown a user interface 1100 which may comprise a listing of groups 1101, group configuration options 1102, and buttons 1103 and 1104 that allow a user to delete and add groups. In some embodiments, the listing of groups 1101 may include one or more group names, one or more minimum values, and one or more maximum values. The group configuration options 1102 may have one or more inputs that allow the user to set various parameters for each group such as, for example, a minimum value, a maximum value, a routing option (for example, internal or outsource), a priority (for example, high or low), and/or an aging period.

It is recognized that these are merely examples, and a user may be presented with a different interface that may be used to accomplish substantially the same or similar tasks and to view substantially the same or similar information. In some embodiments, a user interface may present more, fewer, different, or the same options to users and may arrange the options differently such as, for example, using a tabbed interface, modal windows, or the like. For example, in some embodiments, the user interface may not give users an option to set a minimum or maximum dollar value, or the user interface may present an overall indicator that corresponds to multiple claim items associated with the same procedure, admission, and so forth. In some embodiments, the system may interface with other systems that indicate human resource costs and timing expectations for the review by specific employees or departments and/or costs and timing expectations for the review by outsourcing systems.

AI/ML Claims Processing Platform

Figure 12:
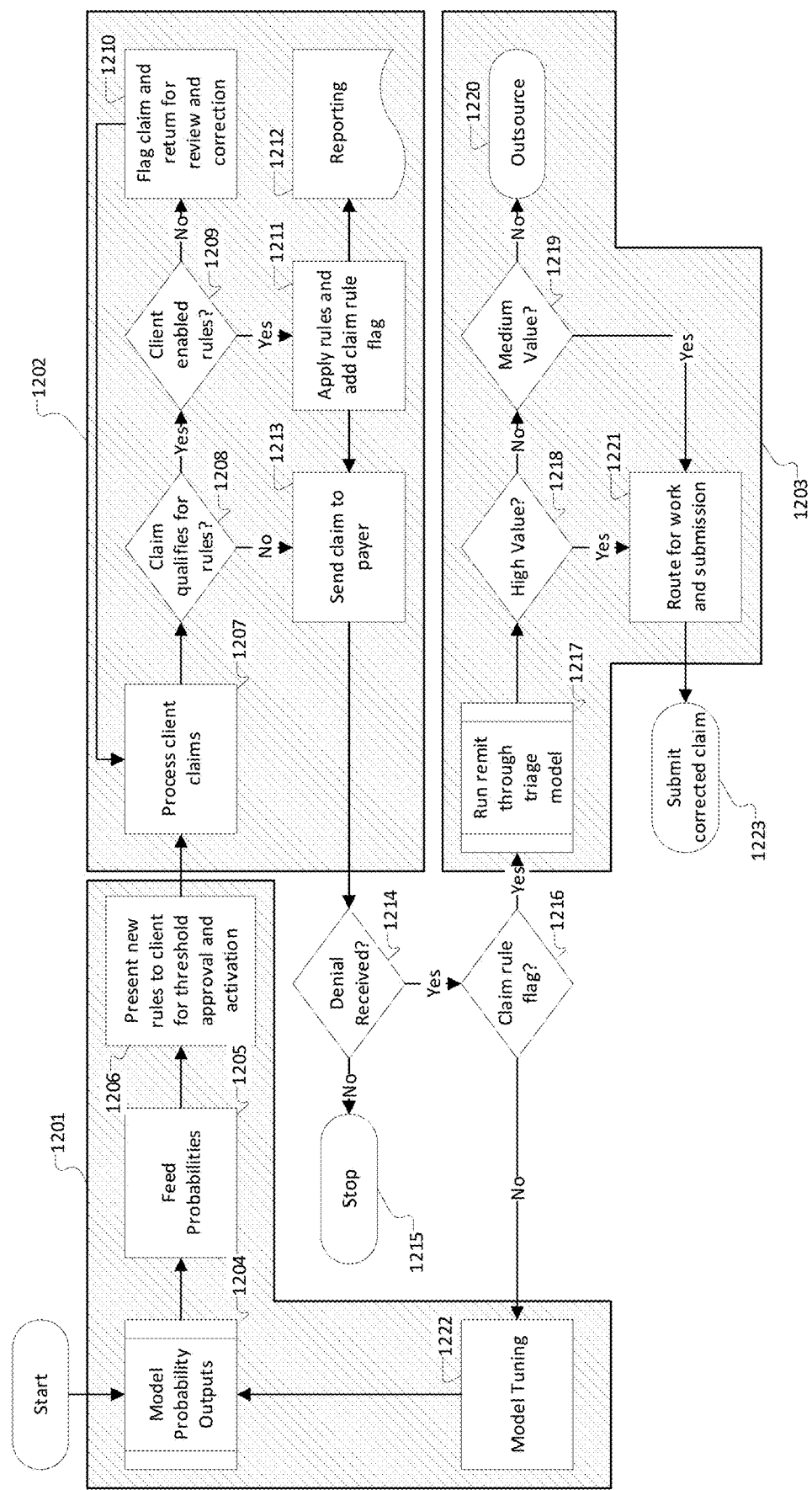
FIG. 12 is a diagram illustrating proactive and reactive claim denial working together as part of an overall claim system according to an embodiment.

The embodiments above describe an AI/ML proactive claims processing system 400 as well as an AI/ML reactive claims processing system 800. While these systems may be implemented as separate systems, it is recognized that in some embodiments both systems can be implemented as part of an AI/ML claims processing platform to utilize input from full cycle data sources. For example, FIG. 12 is a diagram illustrating the AI/ML proactive claim processing system 400 and the AI/ML reactive claim processing system 800 working together as part of an overall AI/ML claims processing system 104 according to an embodiment. Within model block 1201, the AI/ML claims processing system 104 may generate, train, and tune one or more models, and/or may create new parameters. At block 1204, the AI/ML claims processing system 104 may apply one or more of the AI/ML proactive models to the claims submission data to generate corresponding probability data that indicate the likelihood of the claim being denied by the payer. At block 1205, the AI/ML claims processing system 104 feeds the probability data into the platform, and then at block 1206, the probability data and claims data is presented to a user for threshold approval and activation through a proactive claim system 1202. The presentation may be via user interface housed on the AI/ML claims processing system 104 or residing on a client system.

Within the proactive claim system 1202, the AI/ML claims processing system 104 may process claims for initial submission. At 1207, the AI/ML claims processing system 104 may process a client's set of claims which may include a single claim or multiple claims. At block 1208, the AI/ML claims processing system 104 may determine if one or more claims qualify for one or more rules, such as edit rules. If the claim does qualify for one or more rules, the AI/ML claims processing system 104 may, at block 1209, determine if the client has enabled the automatic application of the one or more relevant rules. If the client has not enabled the automatic application of the one or more relevant rules, the claim may be flagged and returned to the client for review and correction at block 1210. After correction, the AI/ML claims processing system 104 may process the corrected claim at block 1207, and the system may check if the corrected claim qualifies for one or more rules at block 1208 and, if so, whether the client has enabled the rules at block 1209. If a claim qualifies for rules and the client has enabled the automatic application of the rules, the AI/ML claims processing system 104 may at block 1211 automatically edit the claim and add a claim rule flag. The AI/ML claims processing system 104 may generate one or more electronic reports at block 1212 based on the claims flagged by the system at block 1211 such as, for example, the specific modifications that were made to the claims. At block 1213, the AI/ML claims processing system 104 may generate transmission data packages for each of the respective payer systems and send the data packages or make the data packages available to the respective payer systems.

At decision block 1214, the AI/ML claims processing system 104 may determine if one or more claims were denied, such as, for example, by parsing and analyzing remit data associated with one or more of the claims. If a denial was received, then at decision block 1216, the system may feed the claim denial information into the model training block 1201 for use in tuning the model to develop new models and to provide a feedback loop.

If, at decision 1216, the claim rule flag is set, the remit may be routed through a reactive claim system 1203. Within the reactive claim system, at block 1203, the system may run the claim through a remit triage model 1217 such as the AI/ML reactive claim processing system 800 which may output an assessment of the probability of approval after resubmission as well as an expected value for the claim. At decision blocks 1218 and 1219, the predicted value of the claim may determine a course of action, such as outsourcing claims that are not of at least high or medium value or routing high and/or medium value claims to workflow systems for rework and resubmission. At block 1223, the system may submit a corrected claim for reprocessing by a payer. In some embodiments, the AI/ML claims processing system 104 may determine if one or more resubmitted claims were denied, such as, for example, by parsing and analyzing remit data associated with one or more of the claims in block 1214.

It is recognized that other embodiments could be used that combine a proactive and reactive system for initial claim submissions and post-denial claim submissions. The AI/ML claims processing system 104 may store parameters for generating and deploying the AI/ML models that may be different based on the providers as well as the payers.

Computer Systems

Figure 13:
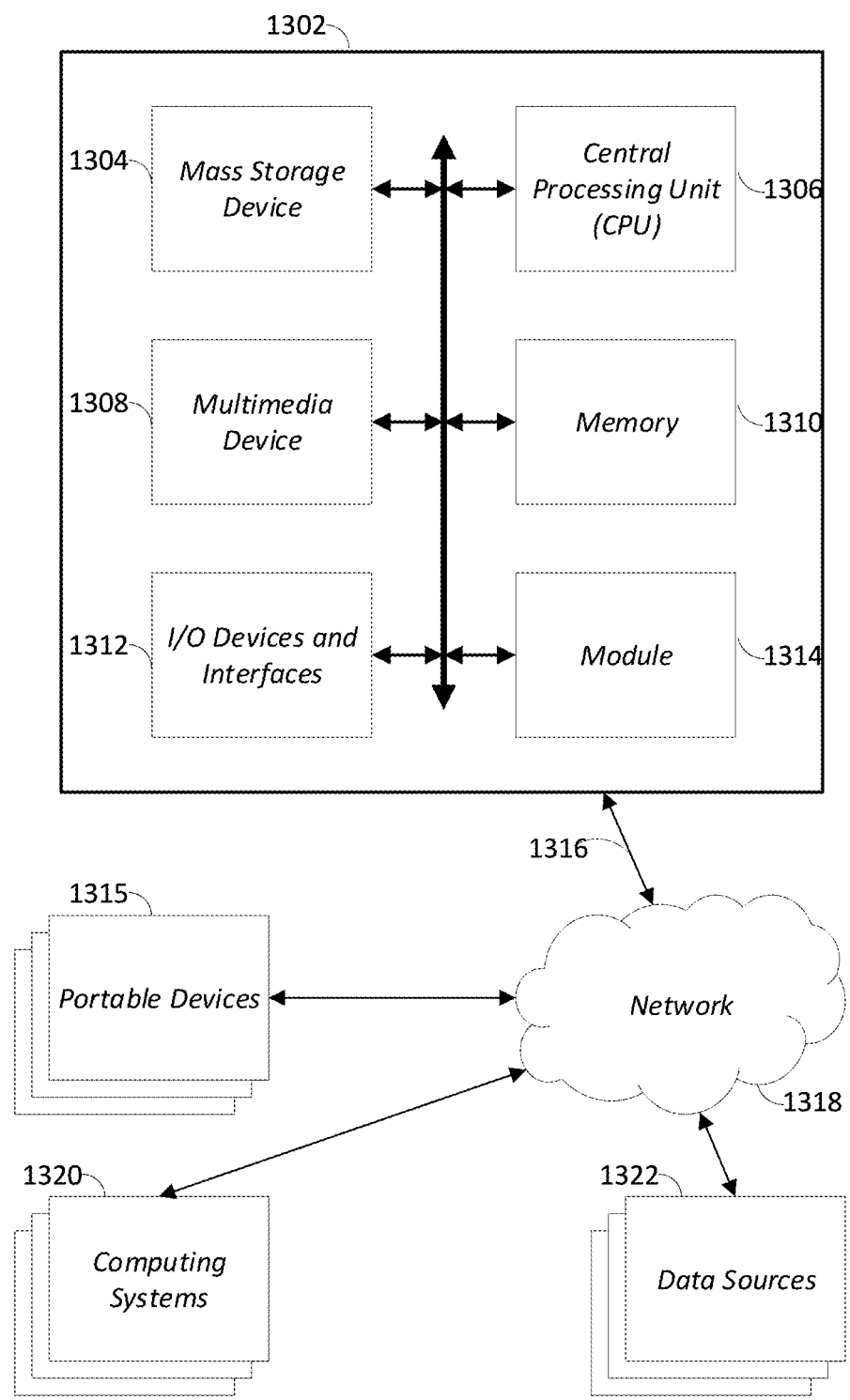
FIG. 13 illustrates an embodiment of a computer system that can be configured to perform one or more of the methods or processes described herein.

FIG. 13 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 13. The example computer system 1302 is in communication with one or more computing systems 1320 and/or one or more data sources 1322 via one or more networks 1318. While FIG. 13 illustrates an embodiment of a computing system 1302, it is recognized that the functionality provided for in the components and modules of computer system 1302 may be combined into fewer components and modules, or further separated into additional components and modules.

The computer system 1302 can comprise a module 1314 that carries out the functions, methods, acts, and/or processes described herein. The module 1314 is executed on the computer system 1302 by a central processing unit 1306 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1302 includes one or more processing units (CPU) 1306, which may comprise a microprocessor. The computer system 1302 further includes a physical memory 1310, such as random-access memory (RAM) for temporary storage of information, a read only memory (ROM) for permanent storage of information, and a mass storage device 1304, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1302 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1302 includes one or more input/output (I/O) devices and interfaces 1312, such as a keyboard, mouse, touch pad, and printer. The I/O devices and interfaces 1312 can include one or more display devices, such as a monitor, that allows the visual presentation of data to a user. More particularly, a display device provides for the presentation of GUIs as application software data, and multi-media presentations, for example. The I/O devices and interfaces 1312 can also provide a communications interface to various external devices. The computer system 1302 may comprise one or more multi-media devices 1308, such as speakers, video cards, graphics accelerators, and microphones, for example.

The computer system 1302 may run on a variety of computing devices, such as a server, a Windows server, a Structure Query Language server, a Unix Server, a personal computer, a laptop computer, and so forth. In other embodiments, the computer system 1302 may run on a cluster computer system, a mainframe computer system and/or other computing system suitable for controlling and/or communicating with large databases, performing high volume transaction processing, and generating reports from large databases. The computing system 1302 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1302 illustrated in FIG. 13 is coupled to a network 1318, such as a LAN, WAN, or the Internet via a communication link 1316 (wired, wireless, or a combination thereof). Network 1318 communicates with various computing devices and/or other electronic devices. Network 1318 is communicating with one or more computing systems 1320 and one or more data sources 1322. The module 1314 may access or may be accessed by computing systems 1320 and/or data sources 1322 through a web-enabled user access point. Connections may be a direct physical connection, a virtual connection, and other connection type. The web-enabled user access point may comprise a browser module that uses text, graphics, audio, video, and other media to present data and to allow interaction with data via the network 1318.

Access to the module 1314 of the computer system 1302 by computing systems 1320 and/or by data sources 1322 may be through a web-enabled user access point such as the computing systems' 1320 or data source's 1322 personal computer, cellular phone, smartphone, laptop, tablet computer, e-reader device, audio player, or another device capable of connecting to the network 1318. Such a device may have a browser module that is implemented as a module that uses text, graphics, audio, video, and other media to present data and to allow interaction with data via the network 1318.

The output module may be implemented as a combination of an all-points addressable display such as a cathode ray tube (CRT), a liquid crystal display (LCD), a plasma display, or other types and/or combinations of displays. The output module may be implemented to communicate with input devices 1312 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s)

may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1302 may comprise a physical or logical connection established between a remote microprocessor and a mainframe host computer for the express purpose of uploading, downloading, or viewing interactive data and databases on-line in real time. The remote microprocessor may be operated by an entity operating the computer system 1302, including the client server systems or the main server system, an/or may be operated by one or more of the data sources 1322 and/or one or more of the computing systems 1320. In some embodiments, terminal emulation software may be used on the microprocessor for participating in the micro-mainframe link.

In some embodiments, computing systems 1320 who are internal to an entity operating the computer system 1302 may access the module 1314 internally as an application or process run by the CPU 1306.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1302 may include one or more internal and/or external data sources (for example, data sources 1322). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 1302 may also access one or more databases 1322. The databases 1322 may be stored in a database or data repository. The computer system 1302 may access the one or more databases 1322 through a network 1318 or may directly access the database or data repository through I/O devices and interfaces 1312. The data repository storing the one or more databases 1322 may reside within the computer system 1302.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A system for tuning a claims remittance prediction model, the system comprising:
one or more processors;
a network communications interface;
a memory; and computer code stored in the memory, wherein the computer code, when retrieved from the memory and executed by the one or more processors causes the one or more processors to:
- electronically access a set of claims data associated with a first plurality of healthcare claims, a first plurality of patients, and one or more payer entities associated with entities that provide reimbursement or payment for healthcare services, and a provider identifier associated with a provider of healthcare services;
- electronically access processing parameters specific for the provider using the provider identifier;
- electronically access custom modifications specific for the provider using the provider identifier;
- electronically access regulatory parameters related to one more of federal requirements, state requirements, or county requirements;
- apply the processing parameters, the custom modifications, and the regulatory parameters to the set of claims data to generate a set of modified claims data, the processing parameters including one or more of: data standardization, data linking, or automated data generation;
- generate an artificial intelligence/machine learning (AI/ML) request data package for submission to a server to electronically apply a claims denial probability AI/ML model which is configured to, for each claim associated with the set of modified claims data, predict a likelihood of being denied and generate one or more denial reasons, wherein the claims denial probability AI/ML model has been trained using a first set of historical claim and remit data, wherein the training of the claims denial probability AI/ML model comprises:
  - accessing, an electronic data packet comprising the first set of historical claim and remit data, wherein the first set of historical claim and remit data is associated with a training data set, and wherein the training data set is configured to be updated on a predetermined schedule,
  - extracting the first set of historical claim and remit data from the electronic data packet,
  - accessing, from a data store, one or more model parameters, and
  - based on the first set of historical claim and remit data and the one or more model parameters, training the claims denial probability AI/ML model, wherein the training includes validating the claims denial probability AI/ML model by determining that an error threshold has been satisfied, wherein determining that the error threshold has been satisfied comprises determining that at least one of a false negative rate threshold or a false positive rate threshold has been satisfied;
- send the AI/ML request data package to a model deployment interface of the server via the network communications interface;
- receive from the server a set of claims denial prediction data associated with the set of modified claims data and associated with the first plurality of healthcare claims, the set of claims denial prediction data comprising: prediction indicators indicating a likelihood of being denied by an associated payer entity, and denial reasons indicating potential reasons for denial;
- automatically process the set of claims denial prediction data to electronically identify a first set of claims of the first plurality of healthcare claims associated with a first payer entity of the one or more payer entities where each claim in the first set of claims is associated with a prediction indicator of the set of claims denial prediction data that meet a first threshold indicating a low likelihood of being denied;
- generate a first encrypted claim submission data package comprising the first set of claims;
- send, via the network communications interface, the first encrypted claim submission data package to a first communications interface associated with the first payer entity;
- electronically identify a second set of claims of the first plurality of healthcare claims associated with a second payer entity of the one or more payer entities where each claim in the second set of claims is associated with a prediction indicator of the set of claims denial prediction data that meet a first threshold indicating a low likelihood of being denied;
- generate a second encrypted claim submission data package comprising the second set of claims;
- send, via the network communications interface, the second encrypted claim submission data package to a second communications interface associated with the second payer entity;
- electronically identify a third set of claims of the first plurality of healthcare claims associated with the first payer entity where each claim in the third set of claims is associated with a prediction indicator of the set of claims denial prediction data that meet a second threshold indicating a high likelihood of being denied and associated with at least one denial reason indicating potential reasons for denial for the respective claim;
- generate at least one recommended corrective action for each claim in the third set of claims based on at least the at least one denial reason;
- generate instructions to present the at least one recommended corrective action for each claim in the third set of claims in a user interface for electronic approval by a first agent system;
- in response to receiving an electronic indication of the electronic approval by the first agent system, automatically implement the at least one recommended corrective action for each claim in the third set of claims;
- generate a third encrypted claim submission data package comprising a corrected third set of claims;
- send, via the network communications interface, the third encrypted claim submission data package to the first communications interface associated with the first payer entity;
- access a first set of electronic payer remit data associated with the first set of claims and the third set of claims and indicating a respective approval status or denial status of each claim;
- access a second set of electronic payer remit data associated with the second set of claims and indicating a respective approval status or denial status of each claim;
- electronically process the first set of electronic payer remit data and the second set of electronic payer remit data to associate the first set of electronic payer remit data and the second set of electronic payer remit data with the first set of claims, the second set of claims, and the third set of claims to determine approval or denial status for each claim in the first set of claims, the second set of claims, and the third set of claims;

generate a claim determination data package comprising an electronic indication of determined approval or denial status for each claim in the first set of claims, the second set of claims, and the third set of claims; and send, via the network communications interface, the claim determination data package to a model development server for additional training or updating of the claims denial probability AI/ML model, wherein the additional training or updating is performed by using the electronic indication of determined approval or denial status for each claim in the first set of claims, the second set of claims, and the third set of claims in the claim determination data package.

2. The system of claim 1, further comprising computer code stored in the memory, wherein the computer code, when retrieved from the memory and executed by the one or more processors causes the one or more processors to store computer-executable instructions that:

format the first set of claims and the third set of claims to be in a first standardized format specific to the first payer entity regardless of a format associated with corresponding providers of healthcare services for the claims in the first set of claims and the third set of claims;

format the second set of claims to be in a second standardized format specific to the second payer entity regardless of a format associated with corresponding providers of healthcare services for the claims in the second set of claims; and wherein the first standardized format is different from the second standardized format.

3. The system of claim 1, further comprising computer code stored in the memory, wherein the computer code, when retrieved from the memory and executed by the one or more processors causes the one or more processors to store computer-executable instructions that:

electronically identify a fourth set of claims of the first plurality of healthcare claims associated with the second payer entity where each claim in the fourth set of claims is associated with a prediction indicator of the set of claims denial prediction data that meet a second threshold indicating a high likelihood of being denied and associated with at least one denial reason indicating potential reasons for denial for the respective claim;

generate at least one recommended corrective action for each claim in the fourth set of claims based on at least the at least one denial reason;

generate instructions to present the at least one recommended corrective action for each claim in the fourth set of claims in a user interface for electronic approval by a second agent system;

in response to receiving a second electronic indication of the electronic approval by the second agent system, automatically implement the at least one recommended corrective action for each claim in the fourth set of claims;

generate a fourth encrypted claim submission data package comprising a corrected fourth set of claims; and send, via the network communications interface, the fourth encrypted claim submission data package to the second communications interface associated with the second payer entity.

4. The system of claim 1, wherein the first communications interface is implemented as a first application programming interface, the second communications interface is implemented as a second application programming interface, and model deployment interface is implemented as a third application programming interface.

5. A computer-implemented method of deploying a claims remittance predictive model, the computer-implemented method comprising, as implemented by one or more computing devices configured with specific executable instructions to:

electronically access a set of claims data associated with a first plurality of healthcare claims, a first plurality of patients, and one or more payer entities associated with entities that provide reimbursement or payment for healthcare services, and a provider identifier associated with a provider of healthcare services;

electronically access processing parameters specific for the provider using the provider identifier;

electronically access custom modifications specific for the provider using the provider identifier;

electronically access regulatory parameters related to one more of federal requirements, state requirements, or county requirements;

apply the processing parameters, the custom modifications, and the regulatory parameters to the set of claims data to generate a set of modified claims data, the processing parameters including one or more of: data standardization, data linking, or automated data generation;

generate an artificial intelligence/machine learning (AI/ML) request data package for submission to a server to electronically apply a claims denial probability AI/ML model which is configured to, for each claim associated with the set of modified claims data, predict a likelihood of being denied and generate one or more denial reasons, wherein the claims denial probability AI/ML model has been trained using a first set of historical claim and remit data, wherein the training of the claims denial probability AI/ML model comprises:

accessing, an electronic data packet comprising the first set of historical claim and remit data, wherein the first set of historical claim and remit data is associated with a training data set, and wherein the training data set is configured to be updated on a predetermined schedule, extracting the first set of historical claim and remit data from the electronic data packet, accessing, from a data store, one or more model parameters, and based on the first set of historical claim and remit data and the one or more model parameters, training the claims denial probability AI/ML model, wherein the training includes validating the claims denial probability AI/ML model by determining that an error threshold has been satisfied, wherein determining that the error threshold has been satisfied comprises determining that at least one of a false negative rate threshold or a false positive rate threshold has been satisfied;

send the AI/ML request data package to a model deployment interface of the server via a network communications interface;

receive from the server a set of claims denial prediction data associated with the set of modified claims data and associated with the first plurality of healthcare claims, the set of claims denial prediction data comprising:

prediction indicators indicating a likelihood of being denied by an associated payer entity, and denial reasons indicating potential reasons for denial;

automatically process the set of claims denial prediction data to electronically identify a first set of claims of the first plurality of healthcare claims associated with a first payer entity of the one or more payer entities where each claim in the first set of claims is associated with a prediction indicator of the set of claims denial prediction data that meet a first threshold indicating a low likelihood of being denied;

generate a first encrypted claim submission data package comprising the first set of claims;

send, via the network communications interface, the first encrypted claim submission data package to a first communications interface associated with the first payer entity;

electronically identify a second set of claims of the first plurality of healthcare claims associated with a second payer entity of the one or more payer entities where each claim in the second set of claims is associated with a prediction indicator of the set of claims denial prediction data that meet a first threshold indicating a low likelihood of being denied;

generate a second encrypted claim submission data package comprising the second set of claims;

send, via the network communications interface, the second encrypted claim submission data package to a second communications interface associated with the second payer entity;

electronically identify a third set of claims of the first plurality of healthcare claims associated with the first payer entity where each claim in the third set of claims is associated with a prediction indicator of the set of claims denial prediction data that meet a second threshold indicating a high likelihood of being denied and associated with at least one denial reason indicating potential reasons for denial for the respective claim;

generate at least one recommended corrective action for each claim in the third set of claims based on at least the at least one denial reason;

generate instructions to present the at least one recommended corrective action for each claim in the third set of claims in a user interface for electronic approval by a first agent system;

in response to receiving an electronic indication of the electronic approval by the first agent system, automatically implement the at least one recommended corrective action for each claim in the third set of claims;

generate a third encrypted claim submission data package comprising a corrected third set of claims;

send, via the network communications interface, the third encrypted claim submission data package to the first communications interface associated with the first payer entity;

access a first set of electronic payer remit data associated with the first set of claims and the third set of claims and indicating a respective approval status or denial status of each claim;

access a second set of electronic payer remit data associated with the second set of claims and indicating a respective approval status or denial status of each claim;

electronically process the first set of electronic payer remit data and the second set of electronic payer remit data to associate the first set of electronic payer remit data and the second set of electronic payer remit data with the first set of claims, the second set of claims, and the third set of claims to determine approval or denial status for each claim in the first set of claims, the second set of claims, and the third set of claims;

generate a claim determination data package comprising an electronic indication of determined approval or denial status for each claim in the first set of claims, the second set of claims, and the third set of claims; and send, via the network communications interface, the claim determination data package to a model development server for additional training or updating of the claims denial probability AI/ML model, wherein the additional training or updating is performed by using the electronic indication of determined approval or denial status for each claim in the first set of claims, the second set of claims, and the third set of claims in the claim determination data package.

6. The computer-implemented method of claim 5 further comprising specific executable instructions that:

format the first set of claims and the third set of claims to be in a first standardized format specific to the first payer entity regardless of a format associated with corresponding providers of healthcare services for the claims in the first set of claims and the third set of claims;

format the second set of claims to be in a second standardized format specific to the second payer entity regardless of a format associated with corresponding providers of healthcare services for the claims in the second set of claims; and wherein the first standardized format is different from the second standardized format.

7. The computer-implemented method of claim 5 further comprising specific executable instructions that:

electronically identify a fourth set of claims of the first plurality of healthcare claims associated with the second payer entity, wherein each claim in the fourth set of claims is associated with a prediction indicator of the set of claims denial prediction data that meet a second threshold indicating a high likelihood of being denied and associated with at least one denial reason indicating potential reasons for denial for the respective claim;

generate at least one recommended corrected action for each claim in the fourth set of claims based on at least the at least one denial reason;

generate instructions to present the at least one recommended corrected action for each claim in the fourth set of claims in a user interface for electronic approval by a second agent system;

in response to receiving a second electronic indication of the electronic approval by the second agent system, automatically implement the at least one recommended corrected action for each claim in the fourth set of claims to generate a corrected fourth set of claims;

generate a fourth encrypted claim submission data package comprising the corrected fourth set of claims; and send the fourth encrypted claim submission data package to the second communications interface associated with the second payer entity.

8. The computer-implemented method of claim 5, wherein the first communications interface is implemented as a first application programing interface, the second communications interface is implemented as a second application programming interface, and model deployment interface is implemented as a third application programming interface.

9. A non-transitory computer storage medium storing computer-executable instructions that, when executed by a processor, cause the processor to at least:
- electronically access a set of claims data associated with a first plurality of healthcare claims, a first plurality of patients, and one or more payer entities associated with entities that provide reimbursement or payment for healthcare services, and a provider identifier associated with a provider of healthcare services;
- electronically access processing parameters specific for the provider using the provider identifier;
- electronically access custom modifications specific for the provider using the provider identifier;
- electronically access regulatory parameters related to one more of federal requirements, state requirements, or county requirements;
- apply the processing parameters, the custom modifications, and the regulatory parameters to the set of claims data to generate a set of modified claims data, the processing parameters including one or more of: data standardization, data linking, or automated data generation;
- generate an artificial intelligence/machine learning (AI/ML) request data package for submission to a server to electronically apply a claims denial probability AI/ML model which is configured to, for each claim associated with the set of modified claims data, predict a likelihood of being denied and generate one or more denial reasons, wherein the claims denial probability AI/ML model has been trained using a first set of historical claim and remit data, wherein the training of the claims denial probability AI/ML model comprises:
    - accessing, an electronic data packet comprising the first set of historical claim and remit data, wherein the first set of historical claim and remit data is associated with a training data set, and wherein the training data set is configured to be updated on a predetermined schedule,
    - extracting the first set of historical claim and remit data from the electronic data packet,
    - accessing, from a data store, one or more model parameters, and
    - based on the first set of historical claim and remit data and the one or more model parameters, training the claims denial probability AI/ML model, wherein the training includes validating the claims denial probability AI/ML model by determining that an error threshold has been satisfied, wherein determining that the error threshold has been satisfied comprises determining that at least one of a false negative rate threshold or a false positive rate threshold has been satisfied;
- send the AI/ML request data package to a model deployment interface of the server via a network communications interface;
- receive from the server a set of claims denial prediction data associated with the set of modified claims data and associated with the first plurality of healthcare claims, the set of claims denial prediction data comprising: prediction indicators indicating a likelihood of being denied by an associated payer entity, and denial reasons indicating potential reasons for denial;
- automatically process the set of claims denial prediction data to electronically identify a first set of claims of the first plurality of healthcare claims associated with a first payer entity of the one or more payer entities where each claim in the first set of claims is associated with a prediction indicator of the set of claims denial prediction data that meet a first threshold indicating a low likelihood of being denied;
- generate a first encrypted claim submission data package comprising the first set of claims;
- send, via the network communications interface, the first encrypted claim submission data package to a first communications interface associated with the first payer entity;
- electronically identify a second set of claims of the first plurality of healthcare claims associated with a second payer entity of the one or more payer entities where each claim in the second set of claims is associated with a prediction indicator of the set of claims denial prediction data that meet a first threshold indicating a low likelihood of being denied;
- generate a second encrypted claim submission data package comprising the second set of claims;
- send, via the network communications interface, the second encrypted claim submission data package to a second communications interface associated with the second payer entity;
- electronically identify a third set of claims of the first plurality of healthcare claims associated with the first payer entity where each claim in the third set of claims is associated with a prediction indicator of the set of claims denial prediction data that meet a second threshold indicating a high likelihood of being denied and associated with at least one denial reason indicating potential reasons for denial for the respective claim;
- generate at least one recommended corrective action for each claim in the third set of claims based on at least the at least one denial reason;
- generate instructions to present the at least one recommended corrective action for each claim in the third set of claims in a user interface for electronic approval by a first agent system;
- in response to receiving an electronic indication of the electronic approval by the first agent system, automatically implement the at least one recommended corrective action for each claim in the third set of claims;
- generate a third encrypted claim submission data package comprising a corrected third set of claims;
- send, via the network communications interface, the third encrypted claim submission data package to the first communications interface associated with the first payer entity;
- access a first set of electronic payer remit data associated with the first set of claims and the third set of claims and indicating a respective approval status or denial status of each claim;
- access a second set of electronic payer remit data associated with the second set of claims and indicating a respective approval status or denial status of each claim;
- electronically process the first set of electronic payer remit data and the second set of electronic payer remit data to associate the first set of electronic payer remit data and the second set of electronic payer remit data with the first set of claims, the second set of claims, and the third set of claims to determine approval or denial status for each claim in the first set of claims, the second set of claims, and the third set of claims;
- generate a claim determination data package comprising an electronic indication of determined approval or denial status for each claim in the first set of claims, the second set of claims, and the third set of claims; and send, via the network communications interface, the claim determination data package to a model development server for additional training or updating of the claims denial probability AI/ML model, wherein the additional training or updating is performed by using the electronic indication of determined approval or denial status for each claim in the first set of claims, the second set of claims, and the third set of claims in the claim determination data package.

10. The non-transitory computer storage medium of claim 9, further storing computer-executable instructions that:
    format the first set of claims and the third set of claims to be in a first standardized format specific to the first payer entity regardless of a format associated with corresponding providers of healthcare services for the claims in the first set of claims and the third set of claims;
    format the second set of claims to be in a second standardized format specific to the second payer entity regardless of a format associated with corresponding providers of healthcare services for the claims in the second set of claims; and
    wherein the first standardized format is different from the second standardized format.

11. The non-transitory computer storage medium of claim 9, further storing computer-executable instructions that:
    electronically identify a fourth set of claims of the first plurality of healthcare claims associated with the second payer entity where each claim in the fourth set of claims is associated with a prediction indicator of the set of claims denial prediction data that meet a second threshold indicating a high likelihood of being denied and associated with at least one denial reason indicating potential reasons for denial for the respective claim;
    generate at least one recommended corrected action for each claim in the fourth set of claims based on at least the at least one denial reason;
    generate instructions to present the at least one recommended corrected action for each claim in the fourth set of claims in a user interface for electronic approval by a second agent system;
    in response to receiving a second electronic indication of the electronic approval by the second agent system, automatically implement the at least one recommended corrected action for each claim in the fourth set of claims to generate a corrected fourth set of claims;
    generate a fourth encrypted claim submission data package comprising the corrected fourth set of claims; and
    send the fourth encrypted claim submission data package to the second communications interface associated with the second payer entity.

12. The non-transitory computer storage medium of claim 9, wherein the first communications interface is implemented as a first application programing interface, the second communications interface is implemented as a second application programming interface, and model deployment interface is implemented as a third application programming interface.

13. A system for tuning a claims resubmission predictive model, the system comprising:
    one or more processors;
    a network communications interface;
    a memory; and
    computer code stored in the memory, wherein the computer code, when retrieved from the memory and executed by the one or more processors causes the one or more processors to:
        access a first set of electronic payer remit data associated with a first set of healthcare claims, a first plurality of patients, a first plurality of provider identifiers associated with providers of healthcare services, and a first payer entity associated with an entity that provide reimbursement or payment for healthcare services;
        electronically process the first set of electronic payer remit data to associate each remit data item with at least one of the first set of healthcare claims and an outcome status indicating either approval or denial for each respective healthcare claim to generate a set of denied claims whose outcome status indicates denial;
        generate an artificial intelligence/machine learning (AI/ML) request data package for submission to a server to electronically apply a claims resubmission probability AI/ML model which is configured to, for each claim associated with the set of denied claims, predict a likelihood of being approved upon resubmission, wherein the claims resubmission probability AI/ML model has been trained using a first set of historical claim and remit data, wherein the training of the claims resubmission probability AI/ML model comprises:
            accessing an electronic data packet comprising the first set of historical claim and remit data, wherein the first set of historical claim and remit data is associated with a training data set, and wherein the training data set is configured to be updated on a predetermined schedule,
            extracting the first set of historical claim and remit data from the electronic data packet,
            accessing, from a data store, one or more model parameters, and
            based on the first set of historical claim and remit data and the one or more model parameters, training the claims resubmission probability AI/ML model, wherein the training includes validating the claims resubmission probability AI/ML model by determining that an error threshold has been satisfied, wherein determining that the error threshold has been satisfied comprises determining that at least one of a false negative rate threshold or a false positive rate threshold has been satisfied;
        send the AI/ML request data package to a model deployment interface of the server via the network communications interface;
        receive from the server a set of claims resubmission prediction data associated with the set of denied claims and associated with the first set of healthcare claims, the set of claims resubmission prediction data comprising: prediction indicators indicating a likelihood of being approved upon resubmission;
        electronically access first resubmission parameters associated with a first provider identifier of the first plurality of provider identifiers, the first provider identifier associated with a first subset of the set of denied claims;
        automatically process the first subset of denied claims using at least the first resubmission parameters, the respective prediction indicators indicating the likelihood of being approved upon resubmission, to automatically generate a set of high-priority denied claims from the first subset of denied claims;

automatically generate a resubmission data package comprising the set of high-priority denied claims and a high-priority flag;

send, via the network communications interface, the resubmission data package to a triage system for processing based on the high-priority flag;

access a second set of electronic payer remit data associated with the set of high-priority denied claims and indicating a respective approval status or denial status of each claim;

electronically process the second set of electronic payer remit data to associate the second set of electronic payer remit data with the set of high-priority denied claims to determine approval or denial status for each claim in the set of high-priority denied claims;

generate a claim determination data package comprising an electronic indication of determined approval or denial status for each claim in the set of high-priority denied claims; and send, via the network communications interface, the claim determination data package to a model development server for additional training or updating of the claims resubmission probability AI/ML model, wherein the additional training or updating is performed by using the electronic indication of determined approval or denial status for each claim in the set of high-priority denied claims in the claim determination data package.

14. The system of claim 13, further comprising computer code stored in the memory, wherein the computer code, when retrieved from the memory and executed by the one or more processors causes the one or more processors to store computer-executable instructions that:

automatically process the first subset of denied claims using at least the first resubmission parameters, the respective prediction indicators indicating the likelihood of being approved upon resubmission, to automatically generate a set of medium-priority denied claims from the first subset of denied claims;

automatically generate a resubmission data package comprising the set of medium-priority denied claims and a medium-priority flag; and send, via the network communications interface, the resubmission data package to the triage system for processing based on the medium-priority flag.

15. The system of claim 14, further comprising computer code stored in the memory, wherein the computer code, when retrieved from the memory and executed by the one or more processors causes the one or more processors to store computer-executable instructions that:

automatically process the first subset of denied claims using at least the first resubmission parameters, the respective prediction indicators indicating the likelihood of being approved upon resubmission, to automatically generate a set of low-priority denied claims from the first subset of denied claims;

automatically generate a resubmission data package comprising the set of low-priority denied claims and a low-priority flag; and send, via the network communications interface, the resubmission data package to the triage system for processing based on the low-priority flag.

16. The system of claim 15, further comprising computer code stored in the memory, wherein the computer code, when retrieved from the memory and executed by the one or more processors causes the one or more processors to store computer-executable instructions that:

automatically process the first subset of denied claims using at least the first resubmission parameters, the respective prediction indicators indicating the likelihood of being approved upon resubmission, to automatically generate a set of write-off denied claims from the first subset of denied claims; and automatically flag the set of write-off denied claims with a write-off flag indicating that the set of write-off denied claims should be blocked from being sent to the triage system for processing.

17. The system of claim 13, further comprising computer code stored in the memory, where the computer code, when retrieved from the memory and executed by the one or more processors causes the one or more processors to store computer-executable instructions that:

electronically access second resubmission parameters associated with a second provider identifier of the first plurality of provider identifiers, the second provider identifier associated with a second subset of set of denied claims.

18. The system of claim 13, wherein the set of claims resubmission prediction data includes claim denial reason data associated with at least one health care claim of the first set of healthcare claims indicating one or more reasons for denial of a respective claim.

19. A computer-implemented method of deploying a claims resubmission predictive model, the computer-implemented method comprising, as implemented by one or more computing devices configured with specific executable instructions to:

access a first set of electronic payer remit data associated with a first set of healthcare claims, a first plurality of patients, a first plurality of provider identifiers associated with providers of healthcare services, and a first payer entity associated with an entity that provide reimbursement or payment for healthcare services;

electronically process the first set of electronic payer remit data to associate each remit data item with at least one of the first set of healthcare claims and an outcome status indicating either approval or denial for each respective healthcare claim to generate a set of denied claims whose outcome status indicates denial;

generate an artificial intelligence/machine learning (AI/ML) request data package for submission to a server to electronically apply a claims resubmission probability AI/ML model which is configured to, for each claim associated with the set of denied claims, predict a likelihood of being approved upon resubmission, wherein the claims resubmission probability AI/ML model has been trained using a first set of historical claim and remit data, wherein the training of the claims resubmission probability AI/ML model comprises:

accessing an electronic data packet comprising the first set of historical claim and remit data, wherein the first set of historical claim and remit data is associated with a training data set, and wherein the training data set is configured to be updated on a predetermined schedule, extracting the first set of historical claim and remit data from the electronic data packet, accessing, from a data store, one or more model parameters, and based on the first set of historical claim and remit data and the one or more model parameters, training the claims resubmission probability AI/ML model, wherein the training includes validating the claims resubmission probability AI/ML model by determining that an error threshold has been satisfied, wherein determining that the error threshold has been satisfied comprises determining that at least one of a false negative rate threshold or a false positive rate threshold has been satisfied;

send the AI/ML request data package to a model deployment interface of the server via a network communications interface;

receive from the server a set of claims resubmission prediction data associated with the set of denied claims and associated with the first set of healthcare claims, the set of claims resubmission prediction data comprising: prediction indicators indicating a likelihood of being approved upon resubmission;

electronically access first resubmission parameters associated with a first provider identifier of the first plurality of provider identifiers, the first provider identifier associated with a first subset of the set of denied claims;

automatically process the first subset of denied claims using at least the first resubmission parameters, the respective prediction indicators indicating the likelihood of being approved upon resubmission, to automatically generate a set of high-priority denied claims from the first subset of denied claims;

automatically generate a resubmission data package comprising the set of high-priority denied claims and a high-priority flag;

send the resubmission data package to a triage system for processing based on the high-priority flag;

access a second set of electronic payer remit data associated with the first-set of high-priority denied claims and indicating a respective approval status or denial status of each claim;

electronically process the second set of electronic payer remit data to associate the second set of electronic payer remit data with the set of high-priority denied claims to determine approval or denial status for each claim in the set of high-priority denied claims;

generate a claim determination data package comprising an electronic indication of determined approval or denial status for each claim in the set of high-priority denied claims; and send the claim determination data package to a model development server for additional training or updating of the claims resubmission probability AI/ML model, wherein the additional training or updating is performed by using the electronic indication of determined approval or denial status for each claim in the set of high-priority denied claims in the claim determination data package.

20. The computer-implemented method of claim 19 further comprising specific executable instructions that:

automatically process the first subset of denied claims using at least the first resubmission parameters, the respective prediction indicators indicating the likelihood of being approved upon resubmission, to automatically generate a set of medium-priority denied claims from the first subset of denied claims;

automatically generate a resubmission data package comprising the set of medium-priority denied claims and a medium-priority flag; and send the resubmission data package to the triage system for processing based on the medium-priority flag.

21. The computer-implemented method of claim 20 further comprising specific executable instructions that:

automatically process the first subset of denied claims using at least the first resubmission parameters, the respective prediction indicators indicating the likelihood of being approved upon resubmission, and to automatically generate a set of low-priority denied claims from the first subset of denied claims;

automatically generate a resubmission data package comprising the set of low-priority denied claims and a low-priority flag; and send the resubmission data package to the triage system for processing based on the low-priority flag.

22. The computer-implemented method of claim 21 further comprising specific executable instructions that:

automatically process the first subset of denied claims using at least the first resubmission parameters, the respective prediction indicators indicating the likelihood of being approved upon resubmission, to automatically generate a set of write-off denied claims from the first subset of denied claims; and automatically flag the set of write-off denied claims with a write-off flag indicating that the set of write-off denied claims should be blocked from being sent to the triage system for processing.

23. The computer-implemented method of claim 19 further comprising specific executable instructions that:

electronically access second resubmission parameters associated with a second provider identifier of the first plurality of provider identifiers, the second provider identifier associated with a second subset of set of denied claims.

24. The computer-implemented method of claim 19, wherein the set of claims resubmission prediction data includes claim denial reason data associated with at least one healthcare claim of the first set of healthcare claims indicating one or more reasons for denial of a respective claim.

25. A non-transitory computer storage medium storing computer-executable instructions that, when executed by a processor, cause the processor to at least:

access a first set of electronic payer remit data associated with a first set of healthcare claims, a first plurality of patients, a first plurality of provider identifiers associated with providers of healthcare services, and a first payer entity associated with an entity that provide reimbursement or payment for healthcare services;

electronically process the first set of electronic payer remit data to associate each remit data item with at least one of the first set of healthcare claims and an outcome status indicating either approval or denial for each respective healthcare claim to generate a set of denied claims whose outcome status indicates denial;

generate an artificial intelligence/machine learning (AI/ML) request data package for submission to a server to electronically apply a claims resubmission probability AI/ML model which is configured to, for each claim associated with the set of denied claims, predict a likelihood of being approved upon resubmission, wherein the claims resubmission probability AI/ML model has been trained using a first set of historical claim and remit data, wherein the training of the claims resubmission probability AI/ML model comprises:

accessing an electronic data packet comprising the first set of historical claim and remit data, wherein the first set of historical claim and remit data is associated with a training data set, and wherein the training data set is configured to be updated on a predetermined schedule, extracting the first set of historical claim and remit data from the electronic data packet, accessing, from a data store, one or more model parameters, and based on the first set of historical claim and remit data and the one or more model parameters, training the claims resubmission probability AI/ML model, wherein the training includes validating the claims resubmission probability AI/ML model by determining that an error threshold has been satisfied, wherein determining that the error threshold has been satisfied comprises determining that at least one of a false negative rate threshold or a false positive rate threshold has been satisfied;

send the AI/ML request data package to a model deployment interface of the server via a network communications interface;

receive from the server a set of claims resubmission prediction data associated with the set of denied claims and associated with the first set of healthcare claims, the set of claims resubmission prediction data comprising: prediction indicators indicating a likelihood of being approved upon resubmission;

electronically access first resubmission parameters associated with a first provider identifier of the first plurality of provider identifiers, the first provider identifier associated with a first subset of the set of denied claims;

automatically process the first subset of denied claims using at least the first resubmission parameters, the respective prediction indicators indicating the likelihood of being approved upon resubmission, to automatically generate a set of high-priority denied claims from the first subset of denied claims;

automatically generate a resubmission data package comprising the set of high-priority denied claims and a high-priority flag;

send the resubmission data package to a triage system for processing based on the high-priority flag;

access a second set of electronic payer remit data associated with the first-set of high-priority denied claims and indicating a respective approval status or denial status of each claim;

electronically process the second set of electronic payer remit data to associate the second set of electronic payer remit data with the set of high-priority denied claims to determine approval or denial status for each claim in the set of high-priority denied claims;

generate a claim determination data package comprising an electronic indication of determined approval or denial status for each claim in the set of high-priority denied claims; and send the claim determination data package to a model development server for additional training or updating of the claims resubmission probability AI/ML model, wherein the additional training or updating is performed by using the electronic indication of determined approval or denial status for each claim in the set of high-priority denied claims in the claim determination data package.

26. The non-transitory computer storage medium of claim 25, further storing computer-executable instructions that:

automatically process the first subset of denied claims using at least the first resubmission parameters, the respective prediction indicators indicating the likelihood of being approved upon resubmission, to automatically generate a set of medium-priority denied claims from the first subset of denied claims;

automatically generate a resubmission data package comprising the set of medium-priority denied claims and a medium-priority flag; and send the resubmission data package to the triage system for processing based on the medium-priority flag.

27. The non-transitory computer storage medium of claim 26 further storing computer-executable instructions that:

automatically process the first subset of denied claims using at least the first resubmission parameters, the respective prediction indicators indicating the likelihood of being approved upon resubmission, to automatically generate a set of low-priority denied claims from the first subset of denied claims;

automatically generate a resubmission data package comprising the set of low-priority denied claims and a low-priority flag; and send the resubmission data package to the triage system for processing based on the low-priority flag.

28. The non-transitory computer storage medium of claim 25 further storing computer-executable instructions that:

automatically process the first subset of denied claims using at least the first resubmission parameters, the respective prediction indicators indicating the likelihood of being approved upon resubmission, to automatically generate a set of write-off denied claims from the first subset of denied claims; and automatically flag the set of write-off denied claims with a write-off flag indicating that the set of write-off denied claims should be blocked from being sent to the triage system for processing.

29. The non-transitory computer storage medium of claim 25 further storing computer-executable instructions that:

electronically access second resubmission parameters associated with a second provider identifier of the first plurality of provider identifiers, the second provider identifier associated with a second subset of set of denied claims.

30. The non-transitory computer storage medium of claim 25, wherein the set of claims resubmission prediction data includes claim denial reason data associated with at least one healthcare claim of the first set of healthcare claims indicating one or more reasons for denial of a respective claim.

31. A computer-implemented method of deploying a claims processing predictive model, the computer-implemented method comprising, as implemented by one or more computing devices configured with specific executable instructions to:

electronically access a set of claims data associated with a first plurality of healthcare claims, a first plurality of patients, and one or more payer entities associated with entities that provide reimbursement or payment for healthcare services, and a provider identifier associated with a provider of healthcare services;

electronically access processing parameters specific for the provider using the provider identifier;

electronically access custom modifications specific for the provider using the provider identifier;

electronically access regulatory parameters related to one more of federal requirements, state requirements, or county requirements, apply the processing parameters, the custom modifications, and the regulatory parameters to the set of claims data to generate a set of modified claims data, the processing parameters including one or more of: data standardization, data linking, or automated data generation;

generate an artificial intelligence/machine learning (AI/ML) request data package for submission to a server to electronically apply a claims denial probability AI/ML model which is configured to, for each claim associated with the set of modified claims data, predict a likelihood of being denied and generate one or more denial reasons, wherein the claims denial probability AI/ML model has been trained using a first set of historical claim and remit data, wherein the training of the claims denial probability AI/ML model comprises:

accessing, an electronic data packet comprising the first set of historical claim and remit data, wherein the first set of historical claim and remit data is associated with a training data set, and wherein the training data set is configured to be updated on a predetermined schedule, extracting the first set of historical claim and remit data from the electronic data packet, accessing, from a data store, one or more model parameters, and based on the first set of historical claim and remit data and the one or more model parameters, training the claims denial probability AI/ML model, wherein the training includes validating the claims denial probability AI/ML model by determining that an error threshold has been satisfied, wherein determining that the error threshold has been satisfied comprises determining that at least one of a false negative rate threshold or a false positive rate threshold has been satisfied;

send the AI/ML request data package to a model deployment interface of the server via a network communications interface;

receive from the server a set of claims denial prediction data associated with the set of modified claims data and associated with the first plurality of healthcare claims, the set of claims denial prediction data comprising: prediction indicators indicating the likelihood of being denied by an associated payer entity, and denial reasons indicating potential reasons for denial;

automatically process the set of claims denial prediction data to electronically identify a first set of claims of the first plurality of healthcare claims associated with a first payer entity of the one or more payer entities where each claim in the first set of claims is associated with a prediction indicator of the set of claims denial prediction data that meet a first threshold indicating a low likelihood of being denied;

generate a first encrypted claim submission data package comprising the first set of claims;

send the first encrypted claim submission data package to a first communications interface associated with the first payer entity;

electronically identify a second set of claims of the first plurality of healthcare claims associated with the first payer entity where each claim in the second set of claims is associated with a prediction indicator of the set of claims denial prediction data that meet a second threshold indicating a high likelihood of being denied and associated with at least one denial reason indicating potential reasons for denial for the respective claim;

generate at least one recommended corrected action for each claim in the second set of claims based on at least the at least one denial reason;

generate instructions to present the at least one recommended corrected action for each claim in the second set of claims in a user interface for electronic approval by a first agent system;

in response to receiving an electronic indication of the electronic approval by the first agent system, automatically implement the at least one recommended corrected action for each claim in the second set of claims to generate a corrected second set of claims;

generate a second encrypted claim submission data package comprising the corrected second set of claims;

send the second encrypted claim submission data package to the first communications interface associated with the first payer entity;

access a first set of electronic payer remit data associated with the first set of claims and the second set of claims and indicating a respective approval status or denial status of each claim;

electronically process the first set of electronic payer remit data to associate the first set of electronic payer remit data with the first set of claims and the second set of claims to determine an outcome status indicating either approval or denial for each claim in the first set of claims and the second set of claims, and to generate a set of denied claims whose outcome status indicates denial;

generate a claim determination data package comprising an electronic indication of determined outcome status for each claim in the first set of claims and the second set of claims;

send the claim determination data package to a model development server for additional training or updating of the claims denial probability AI/ML model, wherein the additional training or updated is performed by using the electronic indication of determined outcome status for each claim in the first set of claims and the second set of claims in the claim determination data package;

generate a second artificial intelligence/machine learning-AI/ML request data package for submission to the server to electronically apply a claims resubmission probability AI/ML model which is configured to, for each claim associated with the set of denied claims, predict a likelihood of being approved upon resubmission, wherein the claims resubmission probability AI/ML model has been trained using a first set of historical claim and remit data, wherein the training of the claims resubmission probability AI/ML model comprises:

accessing an electronic data packet comprising the first set of historical claim and remit data, wherein the first set of historical claim and remit data is associated with a training data set, and wherein the training data set is configured to be updated on a predetermined schedule, extracting the first set of historical claim and remit data from the electronic data packet, accessing, from a data store, one or more model parameters, and based on the first set of historical claim and remit data and the one or more model parameters, training the claims resubmission probability AI/ML model, wherein the training includes validating the claims resubmission probability AI/ML model by determining that an error threshold has been satisfied, wherein determining that the error threshold has been satisfied comprises determining that at least one of a false negative rate threshold or a false positive rate threshold has been satisfied;

send the second AI/ML request data package to the model deployment interface of the server via the network communications interface;

receive from the server a set of claims resubmission prediction data associated with the set of denied claims and associated with the first plurality of healthcare claims, the set of claims resubmission prediction data comprising: prediction indicators indicating a likelihood of being approved upon resubmission;

electronically access first resubmission parameters associated with the provider identifier, the provider identifier associated with a first subset of the set of denied claims;

automatically process the first subset of denied claims using at least the first resubmission parameters, the respective prediction indicators indicating the likelihood of being approved upon resubmission, to automatically generate a set of high-priority denied claims from the first subset of denied claims;

automatically generate a resubmission data package comprising the set of high-priority denied claims and a high-priority flag;

send the resubmission data package to a triage system for processing based on the high-priority flag;

access a second set of electronic payer remit data associated with the set of high-priority denied claims and indicating a respective approval status or denial status of each claim;

electronically process the second set of electronic payer remit data to associate the second set of electronic payer remit data with the set of high-priority denied claims to determine approval or denial status for each claim in the set of high-priority denied claims;

generate a claim determination data package comprising an electronic indication of determined approval or denial status for each claim in the set of high-priority denied claims; and send the claim determination data package to the model development server for additional training or updating of the claims resubmission probability AI/ML model, wherein the additional training or updating is performed by using the electronic indication of determined approval or denial status for each claim in the set of high-priority denied claims in the claim determination data package.

32. A non-transitory computer storage medium storing computer-executable instructions that, when executed by a processor, cause the processor to at least execute the computer-implemented method of claim 31.

33. A system for tuning claims prediction models, the system comprising computer code stored in a memory, wherein the computer code, when retrieved from a memory of the system and executed by one or more processors of the system causes the one or more processors to at least execute the computer-implemented method of claim 31.

* * * * *